US012744459B2

(12) United States Patent
Swamy

(10) Patent No.: US 12,744,459 B2
(45) Date of Patent: Sep. 22, 2026

(54) POWER SUPPLY INCLUDING A RECONFIGURABLE POWER CONVERTER

(71) Applicant: MILWAUKEE ELECTRIC TOOL CORPORATION, Brookfield, WI (US)

(72) Inventor: Mahesh M. Swamy, Gurnee, IL (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 633 days.

(21) Appl. No.: 18/364,322

(22) Filed: Aug. 2, 2023

(65) Prior Publication Data

US 2025/0149980 A1 May 8, 2025

Related U.S. Application Data

(60) Provisional application No. 63/370,310, filed on Aug. 3, 2022.

(51) Int. Cl.
*H01M 10/46* (2006.01)
*H02J 7/00* (2006.01)
*H02M 3/156* (2006.01)

(52) U.S. Cl.
CPC ............ *H02M 3/156* (2013.01); *H02J 7/855* (2026.01)

(58) Field of Classification Search
CPC .......... H02J 7/855; H02J 7/02; H02J 2207/20; H02M 3/156
USPC ................. 320/107, 112, 114, 115, 140, 141
See application file for complete search history.

(56) References Cited

U.S. PATENT DOCUMENTS 10,164,527 B2 * 12/2018 Wang .................... H02M 3/158
2022/0060113 A1 * 2/2022 Yu ........................ H02M 1/0022
2022/0094192 A1 * 3/2022 Wood ...................... H02J 1/122

FOREIGN PATENT DOCUMENTS

CN 117424451 A * 1/2024 .......... H02M 3/1588

* cited by examiner

*Primary Examiner* — Edward Tso
(74) *Attorney, Agent, or Firm* — MICHAEL, BEST & FRIEDRICH LLP

(57) ABSTRACT

A power supply that includes a battery pack, a sensor configured to sense an electrical characteristic of the battery pack, a reconfigurable voltage boost circuit configured to connect to an inverter, and a controller. The reconfigurable voltage boost circuit is configured to switch between a voltage doubler configuration and a voltage tripler configuration in response to a switching control signal based on the electrical characteristic of the battery pack. The controller is connected to the battery pack, the sensor, and the reconfigurable voltage boost circuit. The controller is configured to obtain the electrical characteristic of the battery pack from the sensor, compare the electrical characteristic to a switching threshold, and transmit the switching control signal to the reconfigurable voltage boost circuit based on the comparison of the electrical characteristic and the switching threshold to switch between the voltage doubler configuration and the voltage tripler configuration.

20 Claims, 20 Drawing Sheets

400
402A
412
INVERTER LOAD
404
VOUT (3xVIN)
VOUT (2xVIN)
M2
RB4
C2
C3
C4
M3
RB2
RB3
VIN
VIN
VIN
Sw1
Sw2
Sw3
Sw4
d=0.33
d=0.33
d=0.33
0.33
Dw1
Dw2
C1
RB1
M1
406
48SxP or 50SxP
FRONT-END LOGIC BOARD

802 — Is the cell voltage below Switchover Voltage in Table? Use $V_{IN}$ to determine cell voltage

NO

804 — Set duty cycle for Sw1, and Sw2 to 0; Keep Sw1 and Sw2 OFF

806 — Turn contactor M1 to ON after softcharge, Turn ON contactor M2 to bypass Dw1 and Dw2

808 — Keep Sw1 and Sw2 OFF

Direct Connection to Inverter DC Bus

YES

810 — Set duty cycle for Sw1, and Sw2 to 0.5

812 — Turn contactor M1 to ON after softcharge, Turn OFF contactor M2

814 — Enable gate signals to Sw1, and Sw2 at d=0.5

816 — Turn contactor M1 ON after soft-charge -- continue operation at d=0.5 till pack depletes Voltage Doubler Configuration

FOR 120Vac Inverter Platform

| Pack Configuration | Switch-Over Voltage |
|---|---|
| 5x10SxP (50SxP) | 3.5V/cell |
| 4x12SxP (48SxP) | 3.64V/cell |

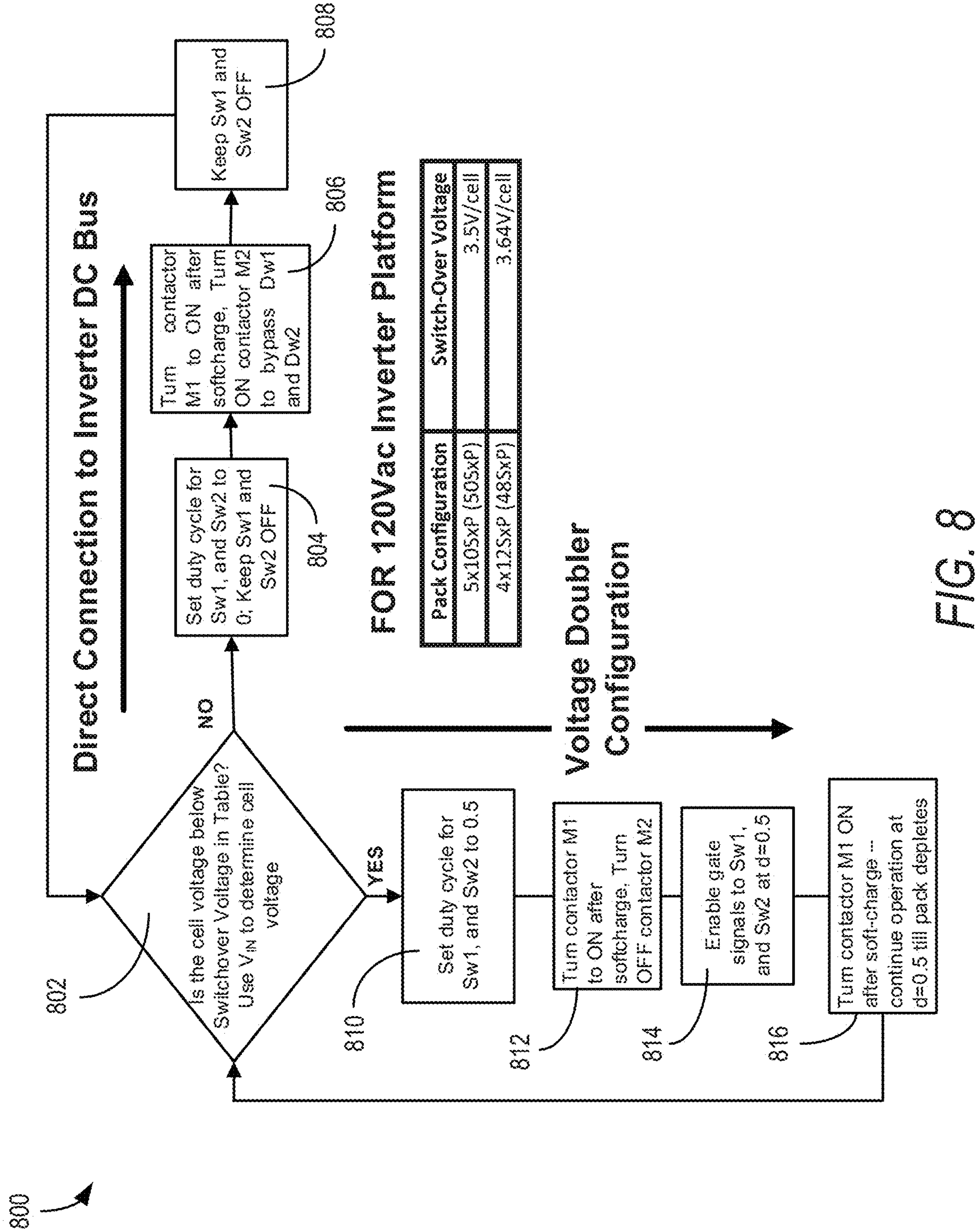

*FIG. 8*

POWER SUPPLY INCLUDING A RECONFIGURABLE POWER CONVERTER

RELATED APPLICATIONS

This application claims the benefit of U.S. Provisional Patent Application No. 63/370,310, filed Aug. 3, 2022, the entire content of which is hereby incorporated by reference.

SUMMARY

A portable power platform may be powered by a core Li-Ion battery bank. The portable power platform may include an AC inverter and be configured to power corded tools or use Li-Ion battery pack chargers to charge corresponding battery packs. The portable power platform can be configured to charge 12V, 18V and even the 80V battery packs. Generating a healthy 120 VAC or 230 VAC and directly charging low voltage battery packs may be achieved by using a low voltage battery pack and a boost converter scheme, as described herein. Specifically, a low voltage battery pack may be used to address the needs of a universal charger, and use a DC transformer type of power converter to step up the low voltage battery pack to a suitable level for powering either 120 VAC output or 230 VAC output inverter. The DC transformer is in the form of a reconfigurable voltage boost circuit employing switched capacitor topology.

Embodiments described herein may use a voltage doubler for achieving the DC bus voltage needed for a 120 VAC inverter and using a voltage tripler under low state of charge (SOC) of the battery pack for achieving DC bus voltage needs for a 230 VAC inverter. In the 230 VAC application, when the SOC is high, the reconfigurable voltage boost circuit is configured as a voltage doubler and when the SOC is reduced below a switch threshold due to the pack being discharged, the switched capacitor topology is reconfigured as a voltage tripler. In the 120 VAC application, when the SOC is high, the reconfigurable voltage boost circuit is configured as a direct connection, and when the SOC reduces below a switch threshold due to the pack being discharged, the switched capacitor topology is reconfigured as a voltage doubler.

Embodiments described herein provide a reconfigurable voltage boost circuit that can be configured as a voltage doubler or a voltage tripler. The reconfigurable voltage boost circuit, using a switched capacitor scheme, may be used to boost input voltage VIN from a battery pack to a DC bus voltage for 120 VAC and 230 VAC applications. If the battery pack voltage begins to approach or reduce below 3.3V per cell (e.g., due to it being discharged), the voltage doubler can be reconfigured to function as a voltage tripler to allow interfacing the reduced voltage battery pack to the 230V inverter DC bus.

Embodiments described herein provide a power supply including a battery pack, a sensor configured to sense an electrical characteristic of the battery pack, a reconfigurable voltage boost circuit configured to connect to an inverter, and a controller. The reconfigurable voltage boost circuit is configured to switch between a voltage doubler configuration and a voltage tripler configuration in response to a switching control signal based on the electrical characteristic of the battery pack. The controller is connected to the battery pack, the sensor, and the reconfigurable voltage boost circuit. The controller is configured to obtain the electrical characteristic of the battery pack from the sensor, compare the electrical characteristic to a switching threshold, and transmit the switching control signal to the reconfigurable voltage boost circuit based on the comparison of the electrical characteristic and the switching threshold to switch between the voltage doubler configuration and the voltage tripler configuration.

Embodiments described herein include a power supply including a battery pack, a sensor configured to sense an electrical characteristic of the battery pack, a reconfigurable voltage boost circuit, and a controller. The reconfigurable voltage boost circuit is configured to connect to an inverter. The reconfigurable voltage boost circuit is configured to switch between direct connection of the battery pack and a voltage doubler configuration in response to a switching control signal based on the electrical characteristic of the battery pack. The controller is connected to the battery pack, the sensor, and the reconfigurable voltage boost circuit. The controller is configured to obtain the electrical characteristic of the battery pack from the sensor, compare the electrical characteristic to a switching threshold, and transmit the switching control signal to the reconfigurable voltage boost circuit based on the comparison of the electrical characteristic and the switching threshold to switch between the direct connection and the voltage doubler configuration.

Embodiments described herein include a reconfigurable voltage boost circuit configured to switch between a direct connection and a voltage doubler configuration, the reconfigurable voltage boost circuit. The reconfigurable voltage boost circuit includes a first switch, a second switch, a third switch, and a fourth switch, and, an input capacitor and two output capacitors. The first switch and the second switch are configured to reconfigure the reconfigurable voltage boost circuit between the direct connection and the voltage doubler configuration in response to a switching control signal. The reconfigurable voltage boost circuit is configured to be connected to an inverter and a battery pack, to provide voltage from the battery pack to a load, and to switch between the direct connection and the voltage doubler configuration to meet a voltage requirement of the inverter in response to a drop in a charge of the battery pack Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of “including,” “comprising,” or “having” and variations thereof are meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings.

Unless the context of their usage unambiguously indicates otherwise, the articles “a,” “an,” and “the” should not be interpreted as meaning “one” or “only one.” Rather these articles should be interpreted as meaning “at least one” or “one or more.” Likewise, when the terms “the” or “said” are used to refer to a noun previously introduced by the indefinite article “a” or “an,” “the” and “said” mean “at least one” or “one or more” unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other aspects of the embodiments will become apparent by consideration of the detailed description and accompanying drawings.

BRIEF DESCRIPTION OF THE DRAWINGS

FIG. 8 illustrates a flow diagram detailing steps for operation of the reconfigurable switched capacitor topology for a 120 VAC inverter platform.

DETAILED DESCRIPTION

In portable power applications that have an inverter, a high voltage battery pack is often used to establish a high DC bus voltage. For example, an optimal DC bus voltage needed for 120 VAC output application may be 175 VDC, and an optimal DC bus voltage needed for 230 VAC output application may be 332 VDC. Connecting multiple low voltage battery packs in series to achieve these targets tends to increase cost and size. Deriving logic voltage levels from a higher voltage battery pack is often an added issue that requires attention. Using low voltage packs in parallel may increase total pack current. The effective battery resistance reduces in a parallel configuration and it is easier to achieve logic level voltages for a given application. However, connecting battery packs in parallel may require cell balancing and perhaps a supervisory control architecture. Moreover, a boost converter may be necessary to achieve a high enough DC bus voltage for proper operation of the inverter when using a low voltage battery pack. Instead of the traditional inductor-based boost converter, the disclosed reconfigurable circuit including a switched capacitor topology can be used to increase pack voltage efficiently.

The disclosed voltage doubler, using the switched capacitor scheme, may be used to boost DC bus voltage for a 230 VAC application. If the pack voltage begins to reduce below, for example, 3.3V per cell (e.g., due to it being discharged), the voltage doubler can be reconfigured to behave as a voltage tripler to allow interfacing the reduced voltage battery pack to the 230V inverter DC bus. If the application pertains only to the North American market (120 Vac output), then only a voltage doubler may suffice.

Although embodiments described herein can be applied to, performed by, or used in conjunction with a variety of high-power devices, embodiments are described primarily with respect to a reconfigurable circuit including a switched capacitor topology for use with a battery.

To accommodate the entire spectrum of voltage needs, five 10 S battery packs connected in series to yield a basic pack structure of 50 S is suggested to be used. If the minimum scalable module (MSM) used is of 12 S configuration, then 4 of the 12 S battery packs in series to yield a basic pack structure of 48 S is yet another potential choice.

Figure 1A:
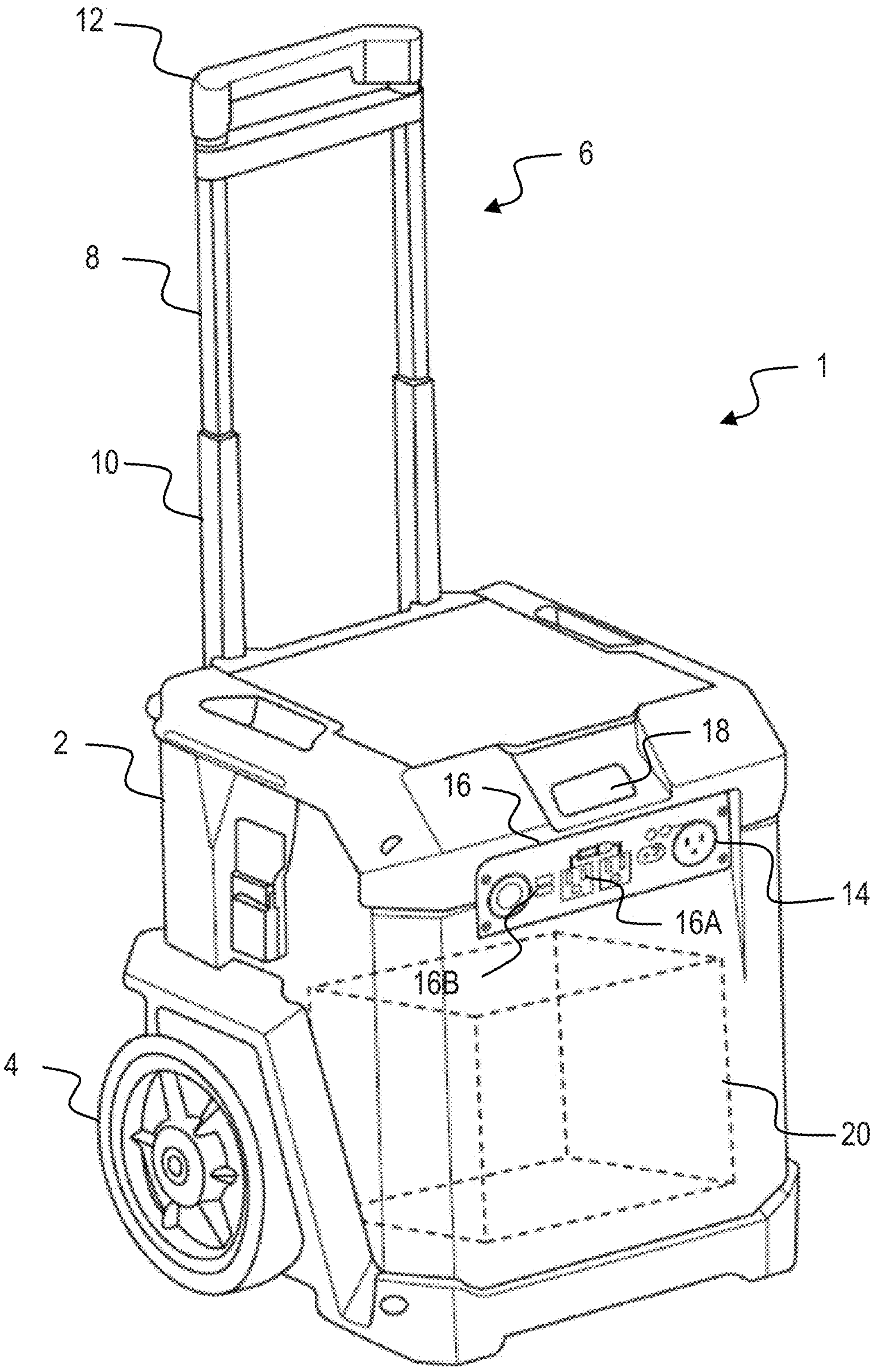
FIG. 1A illustrates a perspective view of a portable power supply device.

FIG. 1A illustrates a portable power supply device or power supply 1. The power supply 1 includes, among other things, a housing 2. In some embodiments, the housing 2 includes one or more wheels 4 and a handle assembly 6. In the illustrated embodiment, the handle assembly 6 is a telescoping handle movable between an extended position and a collapsed position. The handle assembly 6 includes an inner tube 8 and an outer tube 10. The inner tube 8 fits inside the outer tube 10 and is slidable relative to the outer tube 10. The inner tube 8 is coupled to a horizontal holding member 12. In some embodiments, the handle assembly 6 further includes a locking mechanism to prevent inner tube 8 from moving relative to the outer tube 10 by accident. The locking mechanism may include notches, sliding catch pins, or another suitable locking mechanism to inhibit the inner tube 8 from sliding relative to the outer tube 10 when the handle assembly 6 is in the extended position and/or in the collapsed position. In practice, a user holds the holding member 12 and pulls upward to extend the handle assembly 6. The inner tube 8 slides relative to the outer tube 10 until the handle assembly 6 locks in the extended position. The user may then pull and direct the power supply 1 by the handle assembly 6 to a desired location. The wheels 4 of the power supply 1 facilitate such movement.

The housing 2 of power supply 1 further includes a power input unit 14, a power output unit 16, and a display 18. In the illustrated embodiment, the power input unit 14 includes multiple electrical connection interfaces configured to receive power from an external power source. In some embodiments, the external power source is a DC power source. For example, the DC power source may be one or more photovoltaic cells (e.g., a solar panel), an electric vehicle (EV) charging station, or any other DC power source. In some embodiments, the external power source is an AC power source. For example, the AC power source may be a conventional wall outlet, such as a 120 V outlet or a 240 V outlet, found in North America. As another example, the AC power source may be a conventional wall outlet, such as a 220V outlet or 230V outlet, found outside of North America. In some embodiments, the power input unit 14 is replaced by or additionally includes a cable configured to plug into a conventional wall outlet. In some embodiments, the power input unit 14 further includes one or more devices, such as antennas or induction coils, configured to wirelessly receive power from an external power source. The power received by the power input unit 14 may be used to charge a core battery, or internal power source 20, disposed within the housing 2 of power supply 1.

The power received by the power input unit 14 may also be used to provide power to one or more devices connected to the power output unit 16. The power output unit 16 includes one more power outlets. In the illustrated embodiment, the power output unit 16 includes a plurality of AC power outlets 16A and DC power outlets 16B. It should be understood that number of power outlets included in the power output unit 16 is not limited to the power outlets illustrated in FIG. 1A. For example, in some embodiments of the power supply 1, the power output unit 16 may include more or fewer power outlets than the power outlets included in the illustrated embodiment of power supply 1.

In some embodiments, the power output unit 16 is configured to provide power output by the internal power source 20 to one or more peripheral devices. In some embodiments, the power output unit 16 is configured to provide power provided by an external power source directly to one or more peripheral devices. The one or more peripheral devices may be a smartphone, a tablet computer, a laptop computer, a portable music player, a power tool, a power tool battery pack, a power tool battery pack charger, or the like. The peripheral devices may be configured to receive DC and/or AC power from the power output unit 16.

In some embodiments, the DC power outlets 16B include one or more receptacles for receiving and charging power tool battery packs. In such embodiments, power tool battery packs received by, or connected to, the battery pack receptacles 16B are charged with power output by the internal power source 20 and/or power received directly from the external power source. In some embodiments, power tool battery packs connected to the battery pack receptacles 16B are used to provide power to the internal power source 20 and/or one or more peripheral devices connected to outlets of the power output unit 16. In some embodiments, the power output unit 16 includes tool-specific power outlets. For example, the power output unit may include a DC power outlet used for powering a welding tool.

The display 18 is configured to indicate a state of the power supply 1 to a user, such as state of charge of the internal power source 20 and/or fault conditions. In some embodiments the display 18 includes one or more light-emitting diode ("LED") indicators configured to illuminate and display a current state of charge of internal power source 20. In some embodiments, the display 18 is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other embodiments, the power supply 1 does not include a display.

Figure 1B:
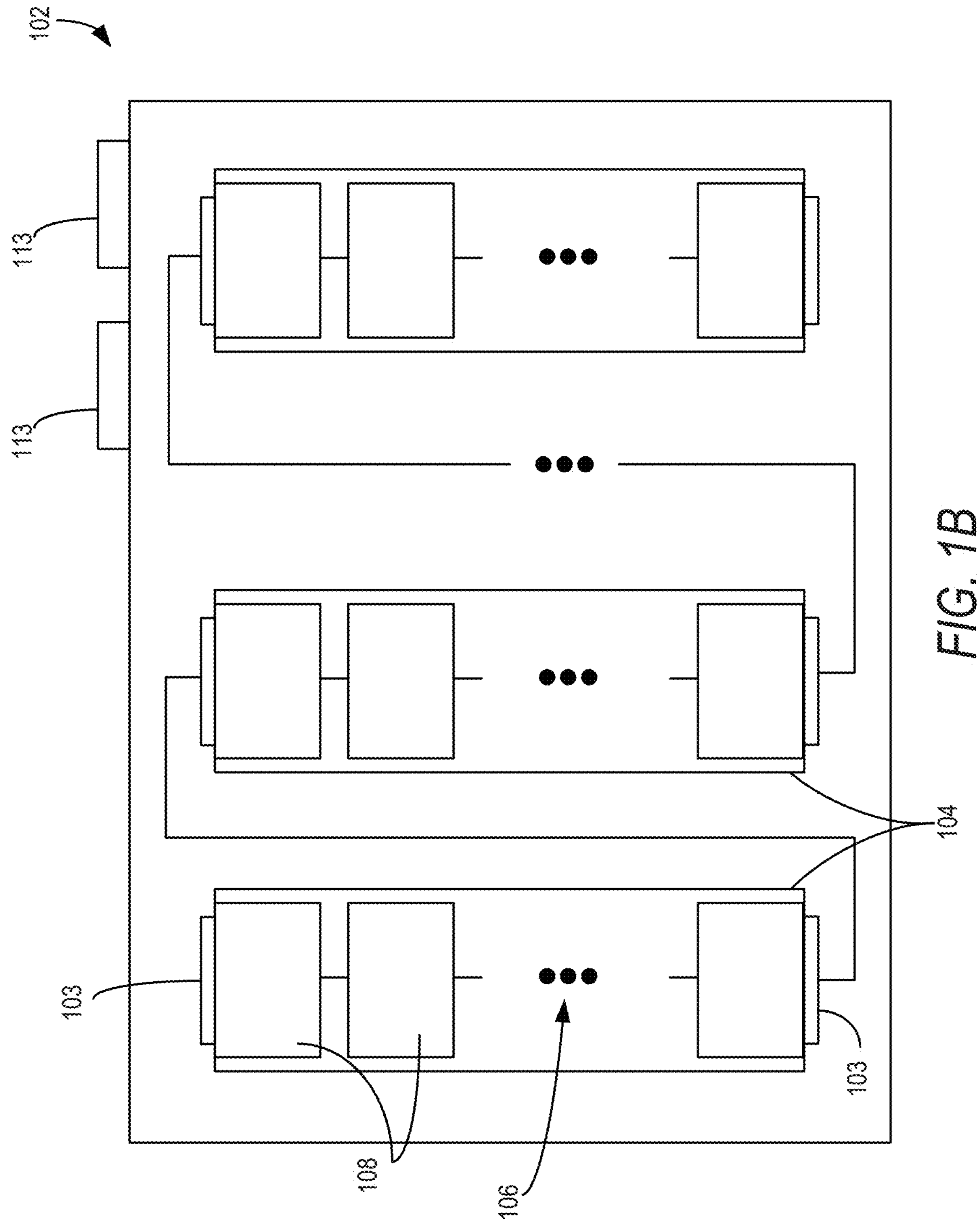
FIG. 1B illustrates a battery pack core for the portable power supply device of FIG. 1 including a plurality of batteries.

FIG. 1B shows a battery pack or battery core 102 including a plurality of batteries 104 connected in series (e.g., internal power source 20 in FIG. 1). The plurality of batteries may vary in quantity from application to application (illustrated in FIG. 1B as an ellipse 106). For example, the battery pack or battery core 102 may include 4 batteries, 5 batteries, 10 batteries, etc., connected in series via their terminals 103. Each of the batteries 104 may include a plurality of cells 108. The plurality of cells 108 may vary from application to application (illustrated in FIG. 1B as an ellipses 106). For example, each battery 104 may include 10 cells, 12 cells, 20 cells, etc. The battery pack or battery core 102 also includes terminals 113 configured to deliver current to a load (not shown) via a conductor when connected to the load via the conductor.

Figure 2:
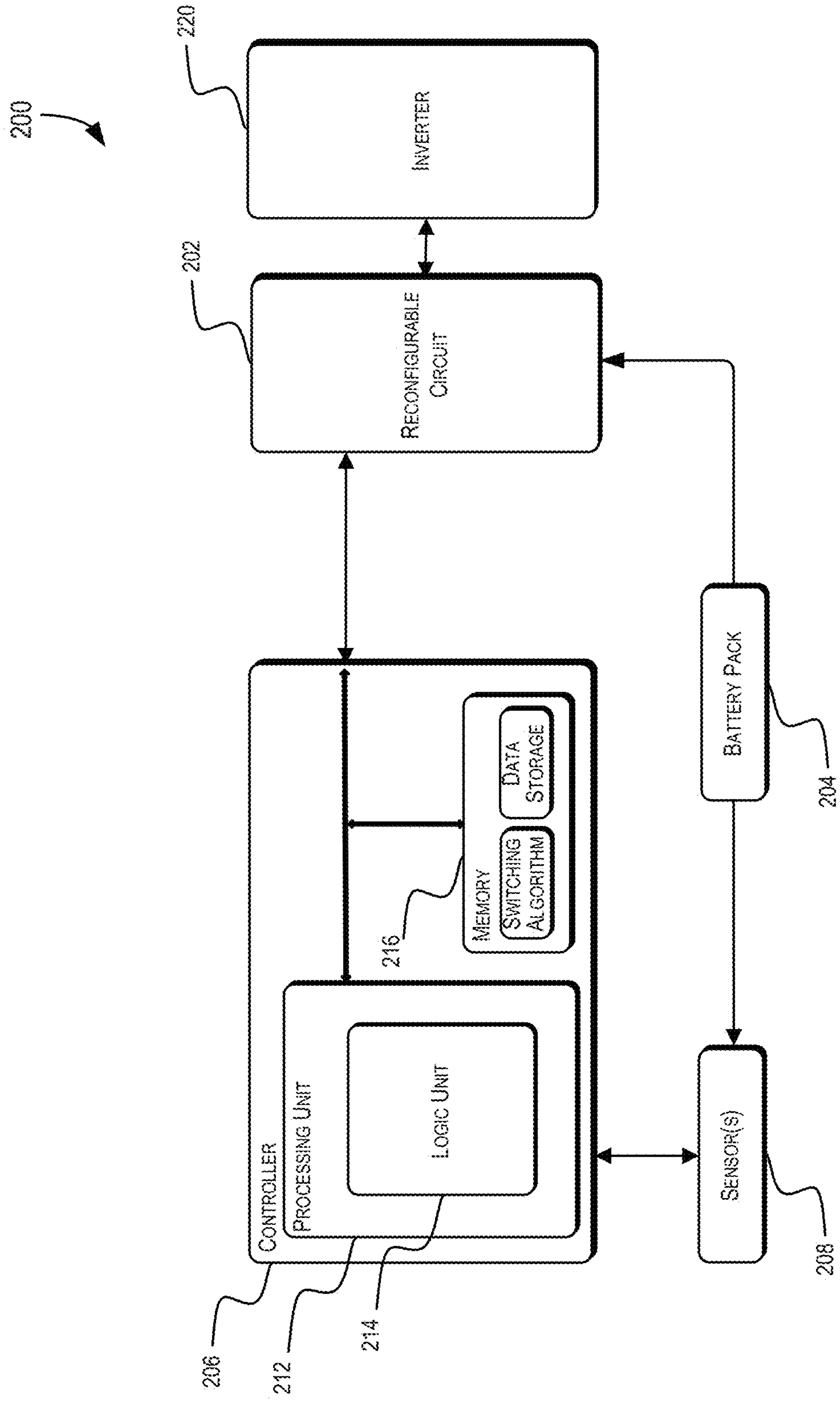
FIG. 2 illustrates a hardware schematic for a reconfigurable circuit connected to a battery pack and a controller.

FIG. 2 shows a hardware schematic 200 for a reconfigurable circuit 202 connected to a battery pack 204 and a controller 206. The battery pack 204 is connected to sensors 208. The sensors 208 are configured to sense an electrical characteristic of the battery pack 204 (e.g., voltage across the terminals of the battery pack 204, current output of the battery pack 204, the voltage across the terminals of a cell 108 of the battery pack 204, etc.). The controller 206 includes a processing unit 212 that includes a logic unit 214. The controller 206 also includes a memory 216 configured to store programs (e.g., a switching logic program) and data (e.g., data from the sensors 208). The controller 206 is configured to obtain electrical characteristics of the battery pack 204 (e.g., quiescent or during discharge) via the sensors 208, and evaluate the electrical characteristics by executing a switching logic program using the logic unit 214. The controller 206 is further configured to communicate switching control signals to the reconfigurable circuit 202 based on the outcome of the evaluation. The reconfigurable circuit 202 may be reconfigured in response to the control signals communicated by the controller 206 and thereby achieve an appropriate voltage boost for use by the battery pack 204 with an inverter 220.

The reconfigurable circuit 202 (e.g., reconfigurable boost converter circuit) may be used as a voltage doubler to achieve a suitable DC bus voltage for a 120 VAC inverter and may be used as a voltage tripler under low state of charge (SOC) of the battery pack 204 for achieving a suitable DC bus voltage for a 230 VAC inverter. When the SOC is high, the reconfigurable circuit 202 may be used as a voltage doubler and, when the SOC starts to reduce due to the battery pack 204 being discharged, the switched capacitor topology of the reconfigurable circuit 202 is configurable to reconfigure it as a voltage tripler.

As an example, for 230 VAC, the optimal DC bus voltage requirement may be calculated as:

$$V_{DC} = \frac{\sqrt{2} \cdot V_{AC}}{0.98} = \frac{\sqrt{2} \cdot 230}{0.98} = 331.9 \text{ V} \tag{1}$$

The DC bus voltage requirement may be met even if cell voltage drops to 2.5V if a voltage tripler is used. The number of low-voltage cells required to be connected in series in order to produce the minimum DC bus voltage, while using a voltage tripler, may be calculated as:

$$n = \frac{332}{3 \times 2.5} = 44.26 \tag{2}$$

Therefore, if a number of 10 s batteries are to be connected in series, 5 of these batteries need to be connected in series to meet the minimum cell count shown in (2). This collection of batteries connected in series may be grouped as a battery pack and referred to herein as a minimum scalable module (MSM).

An example of a 230 VAC application using a 50s battery pack is now given. At a cell voltage of 4.2V per cell, the highest state of charge for this example, a 50 s pack will generate a voltage of 210 VDC. This voltage may be insufficient to supply the calculated DC bus voltage requirement for a 230 VAC inverter (in this case, 332V as calculated in [1]). However, in this example, a voltage doubler may be used to achieve the DC bus voltage requirement. The output of the voltage doubler with the 50 s pack voltage of 210 VDC (4.2V per cell), can be estimated:

$$V_{DC} = (4.2 \times 50 \times 2) - 5 = 415 \; Vdc \tag{3}$$

The estimated output voltage of the doubler when using a 50s battery pack including 4.2V cells is higher than the minimum needed for the DC bus of a 230 VAC inverter. Therefore, the 50 s battery pack in this example can be used with a voltage doubler to produce the DC bus voltage requirement.

As the 50 s battery pack discharges over time across the load, the voltage of the 50 s battery pack starts reducing. The minimum cell voltage supported using the voltage doubler may be determined accordingly:

$$(50 \times x \times 2) - 5 = 325 \text{ V} \tag{4}$$

$$x = \frac{330}{50 \times 2} = 3.3 \text{ V/cell}$$

In response to the battery pack 204 voltage approaching a switching threshold (e.g., a determined minimum cell voltage) the reconfigurable circuit 202 may be changed from a voltage doubler to a voltage tripler. At the end of this reconfiguration process, the expected DC bus voltage can be determined as:

$$V_{DC} = (3.3 \times 50 \times 3) - 5 = 490 \; Vdc \tag{5}$$

The determined expected DC bus voltage may be used to determine appropriately sized capacitors for use on the DC bus. For example, if the DC bus capacitor used for 230 VAC application is rated at 500 VDC, the determined expected DC bus voltage can be used to confirm that the DC bus capacitor can handle the expected voltage across the DC bus.

As the battery pack discharges into the load, the voltage across each cell will continue to drop. Eventually, at its lowest cell voltage of 2.5V per cell, the 50 s pack will generate a voltage of 125 VDC. The voltage at the output of the voltage tripler is expected to be:

$$V_{DC} = (2.5 \times 50 \times 3) - 5 = 370 \; Vdc \tag{6}$$

Voltage drop of 5V across the switches in the switched capacitor topology may be accounted for as well. As shown in calculation (6) 370 VDC is higher than the minimum needed, and the 50 s battery pack should operate satisfactorily even when cell voltage drops to 2.5V if a voltage tripler is used.

As another example, in a 120 VAC application, a 50 s battery pack may be assumed to start off from its highest SOC (e.g. at 4.2V per cell). At the highest cell voltage of 4.2V per cell, the maximum voltage of the battery pack 204 for the 50 s pack will be 210V. This is higher than the optimal DC Voltage requirement:

$$\frac{\sqrt{2}\cdot 120}{0.98} = 173.2\ \text{V} \tag{7}$$

Therefore, with a large enough battery pack 204, no voltage doubler is needed for a 120 VAC output inverter. Specifically, with a large enough battery pack 204 voltage in a 120 VAC application, the battery pack may be directly connected to the inverter via the reconfigurable circuit 202, without any voltage boosting by the reconfigurable circuit. The lowest voltage that the cells can discharge to, before the voltage doubler is put into the reconfigurable circuit 202, may be determined as follows:

$$V_{CELL}\times 50 = 175\ Vdc \tag{8}$$

$$V_{CELL} = 3.5\ Vdc$$

From (8) above, the cells may discharge down to 3.5V per cell, after which a doubler configuration may be engaged to help boost up the DC bus voltage. When the doubler configuration is engaged at 3.5V per cell, the DC bus voltage may gradually increase from 175 VDC to 345 VDC. A 5V drop across the conducting switches in the voltage doubler circuit is accounted for in this doubled voltage value. Assuming the same DC bus capacitors are rated at 500 VDC, this voltage of 345 VDC can be accommodated.

As the pack discharges into the load, the voltage across each cell will continue to drop. Eventually, at a cell voltage of 2.5V per cell, 50 s pack will generate a voltage of 125 VDC. When the battery pack 204 is in this state, the voltage at the output of the voltage doubler configuration may be determined as:

$$V_{DC} = (2.5\times 50\times 2) - 5 = 245\ Vdc \tag{9}$$

A 245 VDC voltage is higher than the 173.2 VDC requirement calculated for this example.

As another example, in a 230 VAC application, a 48 s battery pack including four 12s batteries connected in series may be assumed to start off from its highest SOC (e.g. at 4.2V per cell). At a cell voltage of 4.2V per cell, the highest state of charge for this example, a 48 s pack will generate a voltage of 201 VDC. This voltage is insufficient to supply the needed DC bus voltage for a 230 VAC inverter, which happens to be 332V (from [1]). In such a case, a voltage doubler may be used to meet the minimum voltage requirement of the 230 VAC inverter (e.g., 331.9V as calculated in [1]). Specifically, the output of a voltage doubler with the 48 s pack voltage of 201 VDC (4.2V per cell), is expected to be:

$$V_{DC} = (4.2\times 48\times 2) - 5 = 398\ Vdc \tag{10}$$

The output voltage of the voltage doubler is expected to be higher than the minimum needed for the DC bus of a 230 VAC inverter, and the voltage doubler configuration is therefore expected to meet the minimum voltage requirement of the inverter.

As the pack discharges over time across the load, the voltage of the pack starts reducing. The minimum cell voltage that that will result in the voltage doubler configuration producing an output voltage that meets the minimum voltage requirement of the inverter 220 may be determined as:

$$(48\times x\times 2) - 5 = 325\ \text{V} \tag{11}$$

$$x = \frac{330}{48\times 2} = 3.44\ \text{V/cell}$$

Accordingly, in response to the cell voltage of the battery pack dropping to 3.44V per cell, the disclosed reconfigurable circuit 202 may be reconfigured from a voltage doubler to a voltage tripler. At the end of this reconfiguration process, the DC bus voltage is expected to be:

$$V_{DC} = (3.44\times 48\times 3) - 5 = 490\ Vdc \tag{12}$$

Assuming again that the DC bus capacitor used for 230 VAC application is rated at 500 VDC, the DC bus capacitor can handle the expected voltage across the DC bus.

As the pack discharges into the load, the voltage across each cell will continue to drop. Eventually, at its lowest cell voltage of 2.5V per cell, 48 s pack will generate a voltage of 120 VDC. The expected voltage at the output of the voltage tripler under these circumstances can be determined as:

$$V_{DC} = (2.5\times 48\times 3) - 5 = 355\ Vdc \tag{13}$$

A 355 VDC voltage is higher than the minimum needed, and the unit should therefore operate satisfactorily.

Similar to the 230 VAC inverter application, a 48 s battery pack including four 12s batteries may be assumed to start from its highest SOC. At the highest cell voltage of 4.2V per cell, the maximum pack voltage for the 48 s pack will be 201 VDC. This is higher than voltage requirement for the inverter operation, and therefore no voltage doubler is needed for a 120 Vac output inverter (direct connection). The lowest voltage that the cells may discharge to, before the disclosed reconfigurable circuit is configured as a voltage doubler in response, is computed as follows:

$$V_{CELL}\times 48 = 175\ Vdc \tag{14}$$

$$V_{CELL} = 3.64\ Vdc$$

From (14) above, it can be determined that the cells may discharge down to 3.64V per cell after which the disclosed reconfigurable circuit is configured as a voltage doubler in response to help boost up the DC bus voltage. When the doubler configuration is engaged at 3.64V per cell, the DC bus voltage may gradually increase from 175 VDC to 345 VDC, again accounting for the 5V drop across the conducting switches in the voltage doubler circuit. Assuming the DC bus capacitors are rated at 500 VDC, this voltage of 345 VDC may be accommodated.

As the pack discharges into the load, the voltage across each cell will continue to drop. Eventually, at a voltage of 2.5V per cell, the 48 s pack will generate a voltage of 120 VDC, and the voltage at the expected output of the voltage doubler may be calculated as:

$$V_{DC} = (2.5 \times 48 \times 2) - 5 = 235\ Vdc \quad (15)$$

A 235 VDC voltage is higher than the minimum needed (173.2 VDC in [7]), and the voltage inverter 220 should therefore operate satisfactorily.

Figure 3A:
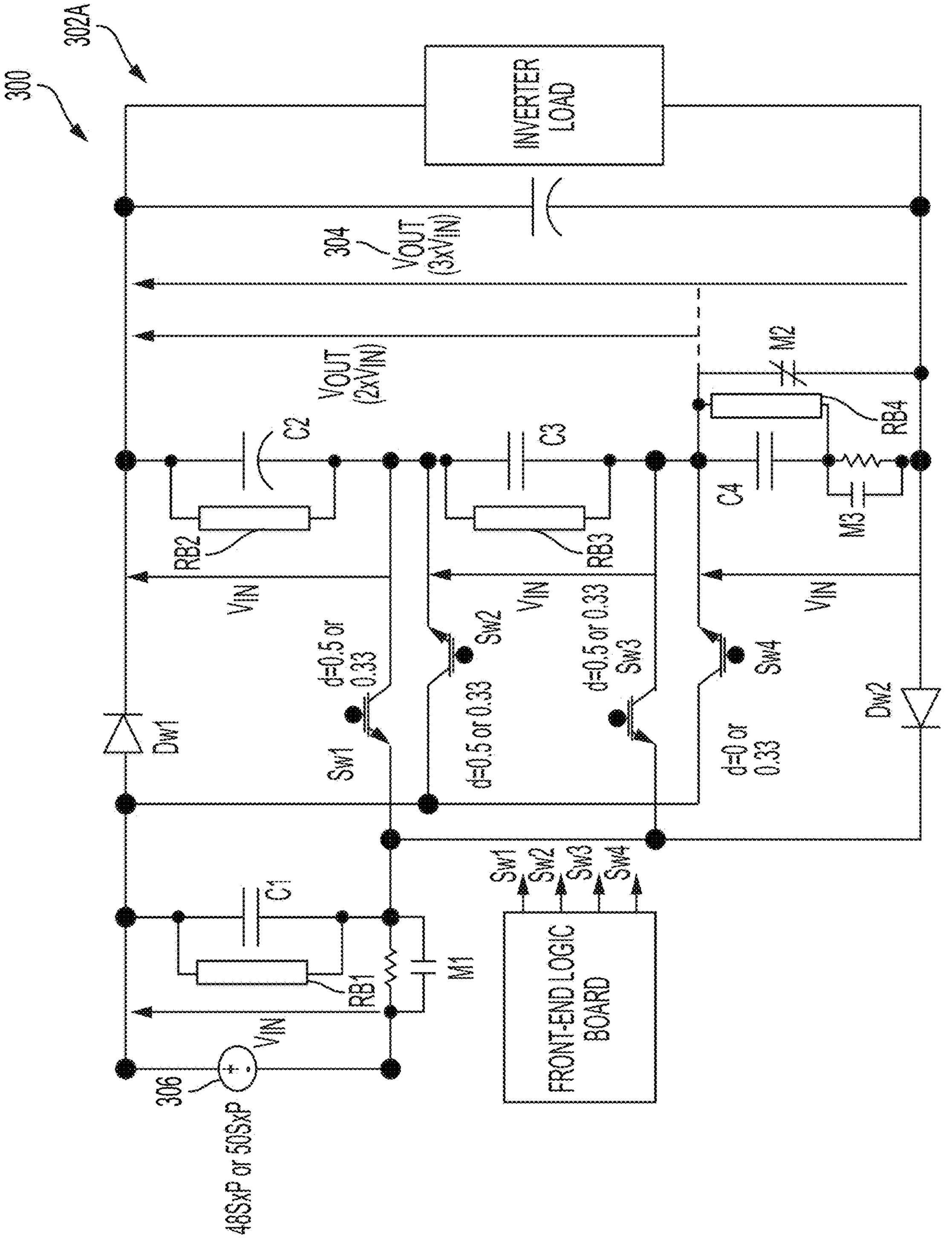
FIG. 3A illustrates a schematic of a topology for the 230 VAC inverter platform, according to embodiments described herein.

Referring to FIG. 3A, a reconfigurable circuit 300 in a voltage tripler 302A is shown. The output voltage 304 of the voltage tripler 302A across the load is 3 times the input voltage $V_{IN}$. In the embodiment shown, the gate pulses (not shown) for the third switch Sw4 can be turned OFF. A normally closed contactor M2, is provided across the output capacitor C4 and is in the OFF state (coils de-energized) at an initial moment when the SOC of input voltage $V_{IN}$ is healthy (e.g., greater than 3.36V per cell for a 50 s pack and 3.5V per cell for a 48 S pack). Hence, contactor M2 bypasses capacitor C4 during normal operation until the cell voltage in the battery pack 306 falls to less than a threshold value (e.g., 3.36V per cell for a 50 s pack or 3.5V per cell for a 48 s pack), at which time, M2 coil is turned ON and the contacts OPEN. Gating of Sw4 commences simultaneously. Soft charge resistor contactor M3 is turned ON after a short time following the gating of switch Sw4. The gate pulse pattern (not shown) for the switches change, from 50% duty cycle to approximately 33% duty cycle, when the configuration changes from a doubler to a tripler. Operation of the reconfigurable circuit 300 is described in further detail below.

When the reconfigurable circuit 300 is used with a 50 s battery pack 306 charged to 4.2V per cell, charge may be moved, by the operation of the reconfigurable circuit, from an input capacitor initially, to a string of two capacitors in series and then to a string of three capacitors in series. Since the output voltage $V_{OUT}$ of the reconfigurable circuit 300 is a fixed ratio of the input voltage $V_{OUT}$, the reconfigurable circuit 300 may not need any feedback circuit or voltage regulator to produce the output voltage, since the output voltage is scaled and is not regulated.

Figure 3B:
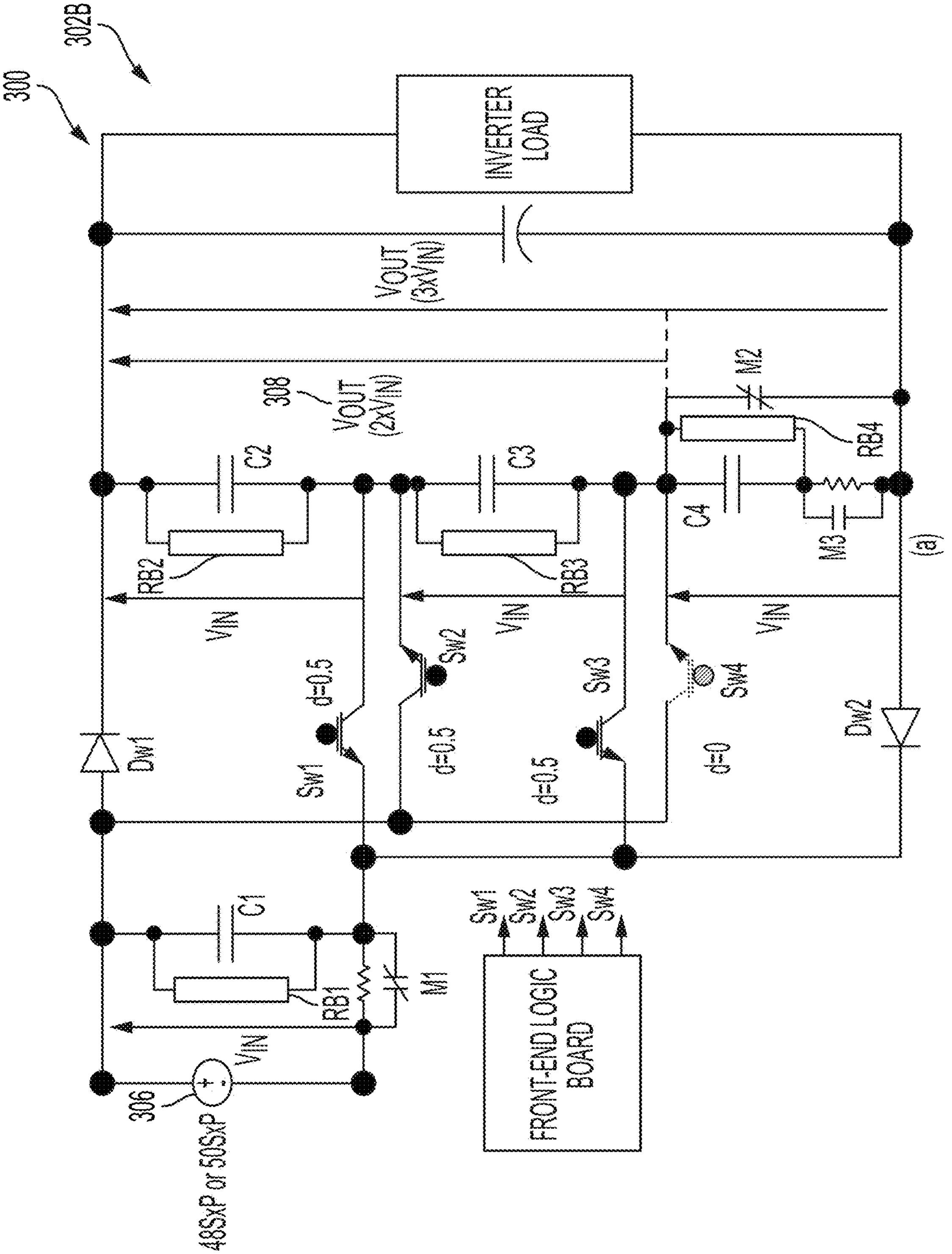
FIG. 3B illustrates a schematic of the topology shown in FIG. 3A when the cell voltage is greater than 3.3V per cell in a 50 s pack or 3.5V per cell in a 48 s pack.
Figure 3C:
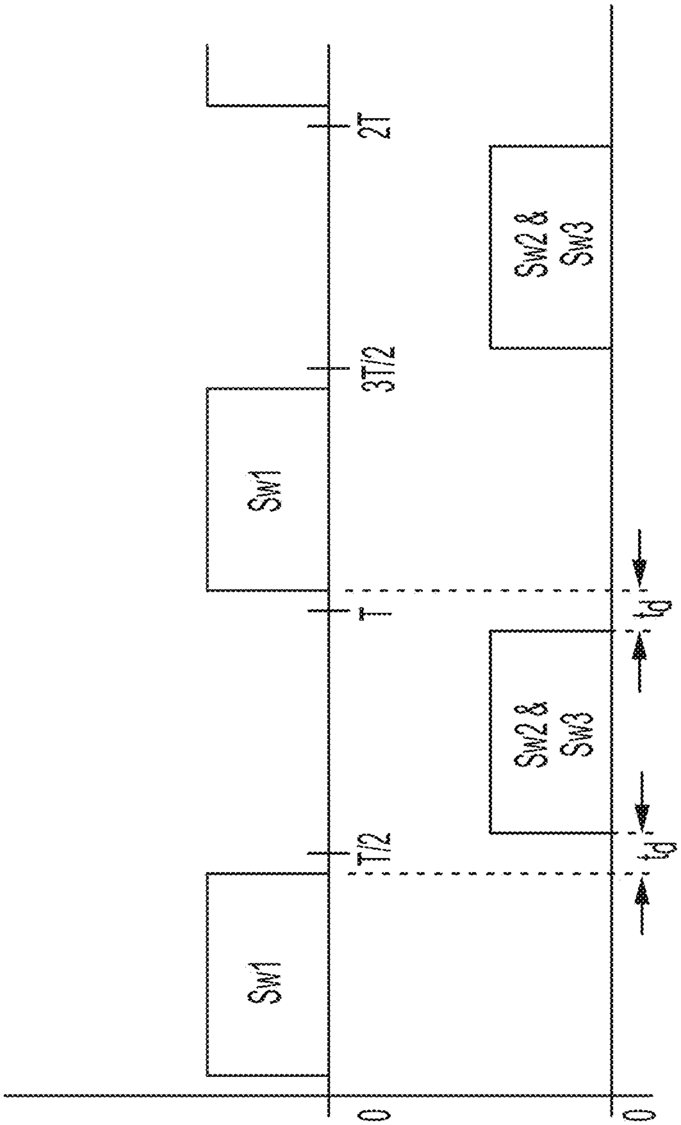
FIG. 3C illustrates a switching scheme for switches Sw1-Sw3 shown in FIG. 3B.

Referring to FIG. 3B, the reconfigurable circuit 300 may be reconfigured in a voltage doubler configuration 302B. The switching scheme for the reconfigurable circuit 300 in FIG. 3B is shown in FIG. 3C. Sw1 and Sw2 (and Sw3) are turned ON and OFF alternately. In the embodiment shown, when Sw1 is ON, Sw2 (and Sw3) are OFF, and when Sw1 is OFF, Sw2 (and Sw3) are ON. There may be a short dead time in between switching on and off. The output voltage of the reconfigurable circuit 300 may be assumed to be equal to the sum of the voltages across each of the output capacitors C2, C3, C4. Since there are two capacitors (C2, C3) in series in the example being described, the voltage at the output 304 may be assumed to be two times $V_{IN}$. Here, each of the output capacitors C2, C3, C4 may be charged to $V_{IN}$ when its corresponding switch-diode Dw1, Sw1, or switch Sw2, Sw3 turns ON. Since the voltage across all the output capacitors C2, C3 are the same, if trace lengths are kept to a minimum and has enough cross-sectional area, the switching current transient can be kept to a minimum.

For a voltage of 4.2V per cell in a 50 s battery pack, the voltage across the terminals may be assumed to be 210 VDC. If the reconfigurable circuit 300 is configured as a doubler to start, as shown in FIG. 3B, an output voltage of 415V is expected for an input of 210 VDC. This voltage is sufficient and is higher than the voltage required (e.g., 332 VDC) for satisfactory operation of a 230 VAC inverter. As shown in FIG. 3C, in the voltage doubler configuration 302B, the contactor M2 remains "closed" and gating for switch 4 remains turned OFF, and the duty cycle of gates for Sw1-Sw3 is maintained at approximately 50%.

Figure 3D:
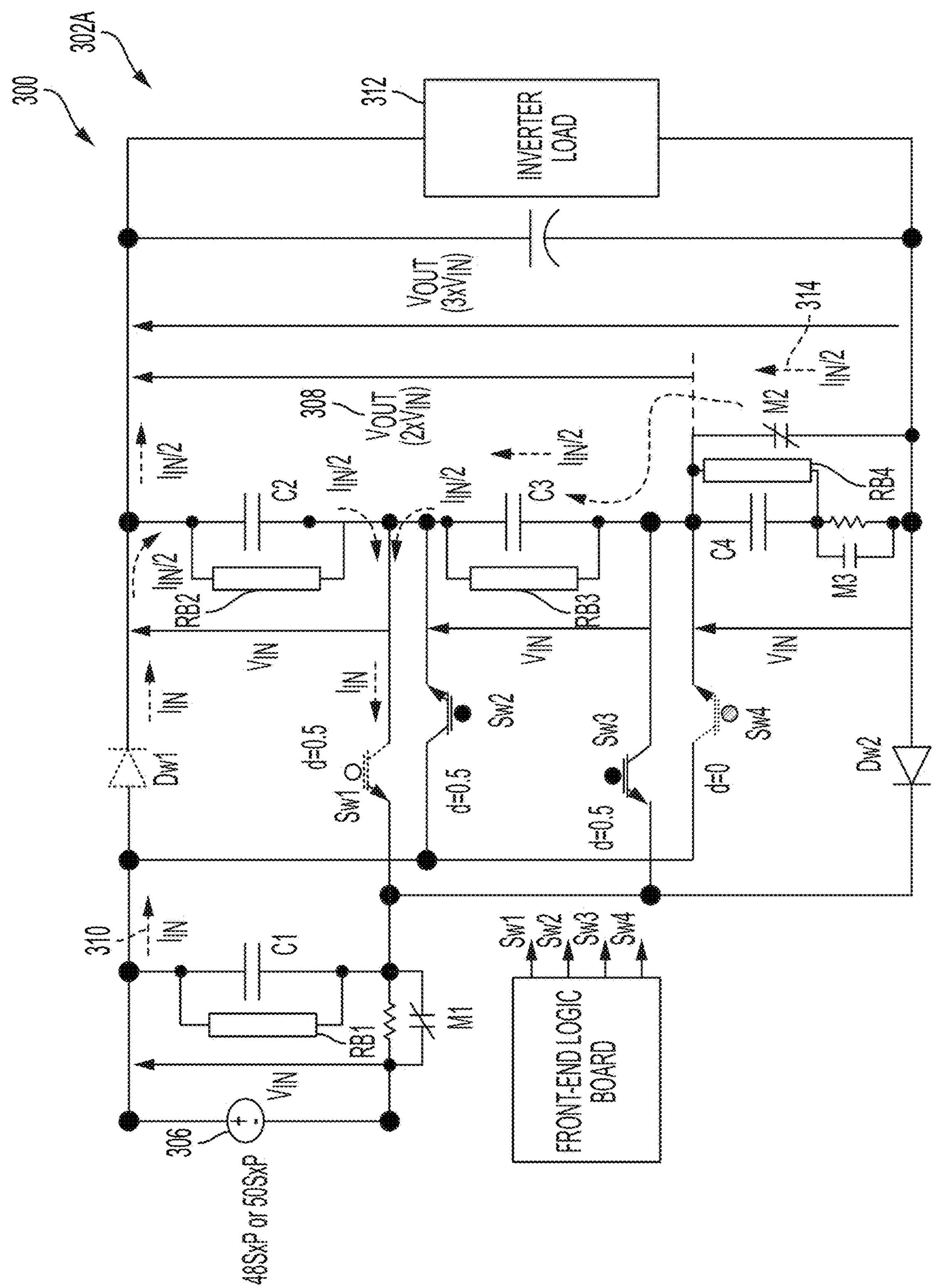
FIG. 3D illustrates a current flow diagram for a first of two operating modes for a voltage doubler configuration of FIG. 3B.
Figure 3E:
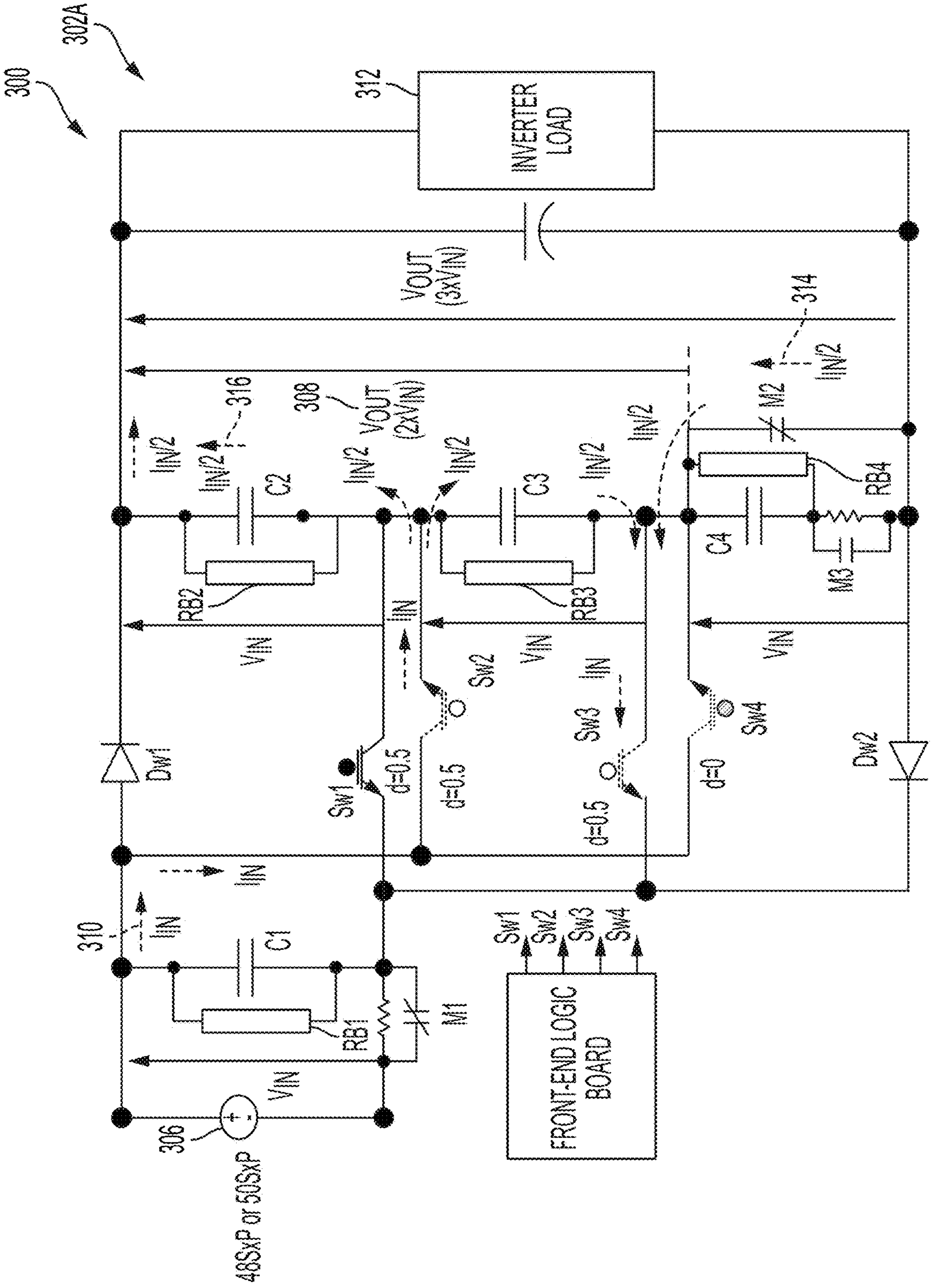
FIG. 3E illustrates a current flow diagram for a second of two operating modes for the voltage doubler configuration of FIG. 3B.

Referring now to FIG. 3D and FIG. 3E, during operation of the voltage doubler configuration 302B of the reconfigurable circuit 300. Sw1, Sw2, and Sw3 are turned ON and OFF alternately. When Sw1 is ON, energy is transferred from the input capacitor C1 to the output capacitor C2 via diode Dw1 and switch Sw1. Half of the input current 310 flows into capacitor C2 charging it and the other half flows into the load 312. The return path of the output load current 314 takes it through C3, which discharges capacitor C3 for this duration. Similarly, when Sw2 (and Sw3) is turned ON, the input capacitor C1 is connected across C3 and energy is transferred from C1 to C3 via Sw2 and Sw3. Half of the output current 314 flows through C2 into the load during which time it discharges C2. The other half flows into C3, which charges capacitor C3. The output current 314, when returning from the load, combines with the current through C3 to form the current flowing back into the battery pack 306 via Sw3. In both modes of operation of the voltage doubler configuration 302*b*, the discharge of either C2 or C3 balances the charging of C3 or C2, respectively. This allows the average output voltage to be constant at 2 times the input voltage $V_{IN}$.

Figure 4A:
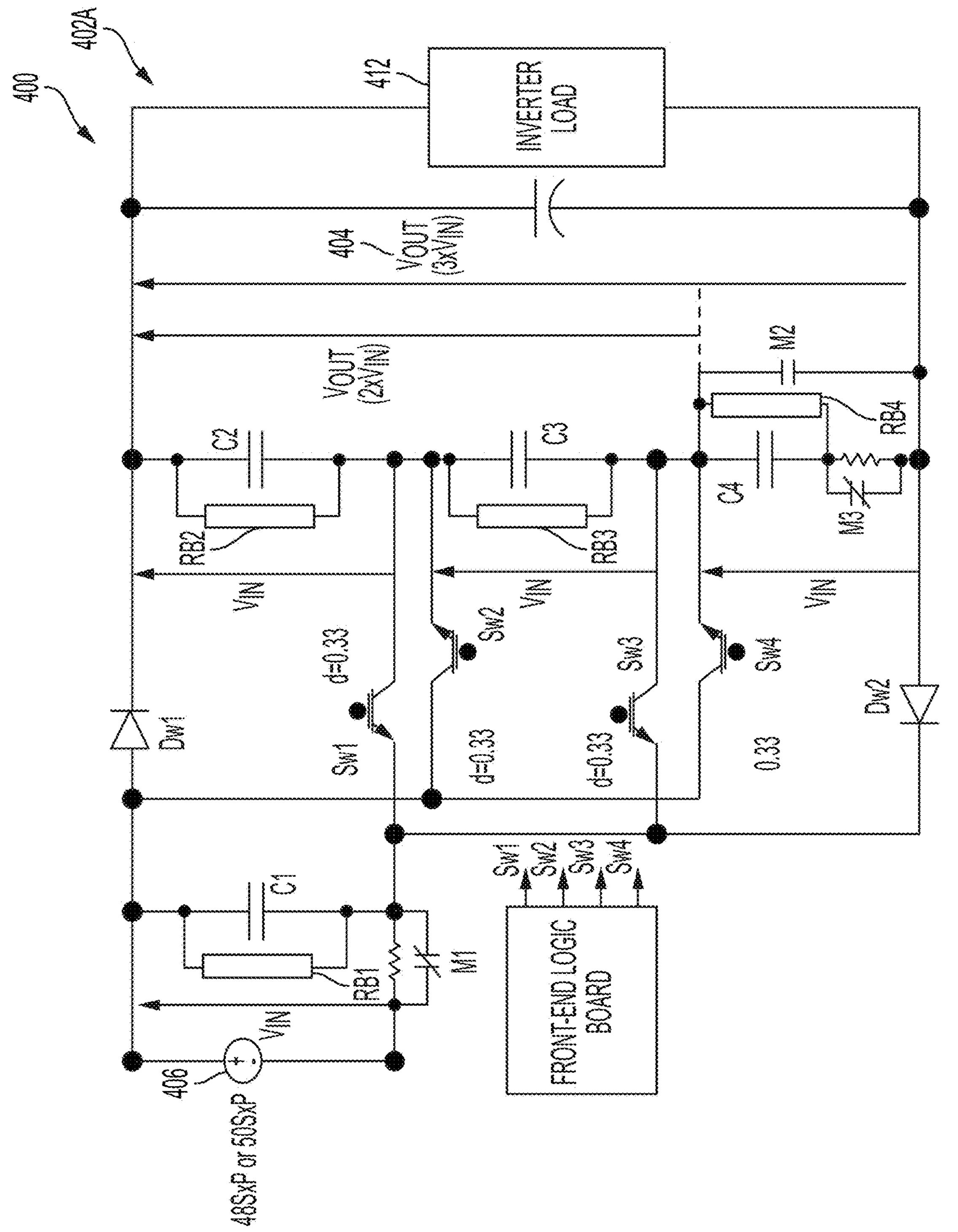
FIG. 4A illustrates a schematic of the topology shown in FIG. 3A when the cell voltage is less than 3.3V per cell in a 50 s pack or 3.5V per cell in a 48 s pack.

Referring now to FIG. 4A, the reconfigurable circuit may reconfigure itself as a voltage tripler 402A. As the cell voltage starts to drop due to discharge, the DC bus voltage may fall below the minimum needed to guarantee healthy output. To prevent this, in response to the battery pack 406 reaching 3.3V per cell, the gating for switch Sw4 is turned ON and the contactor M2 is turned OFF and its contacts open according to the voltage tripling switching scheme shown in FIG. 4B. Gating scheme for all switches (Sw1-Sw4) is set at 33% duty cycle. Voltage across C3 starts to build and after a few PWM cycles, contactor M3 is closed, and the soft charge resistor is bypassed. The total output load voltage gradually increases from 325 VDC to 490 VDC and then it starts gradually reducing to 370 VDC as the pack discharges into the load. Eventually, the battery energy is spent, and the system may turn itself OFF.

Figure 4B:
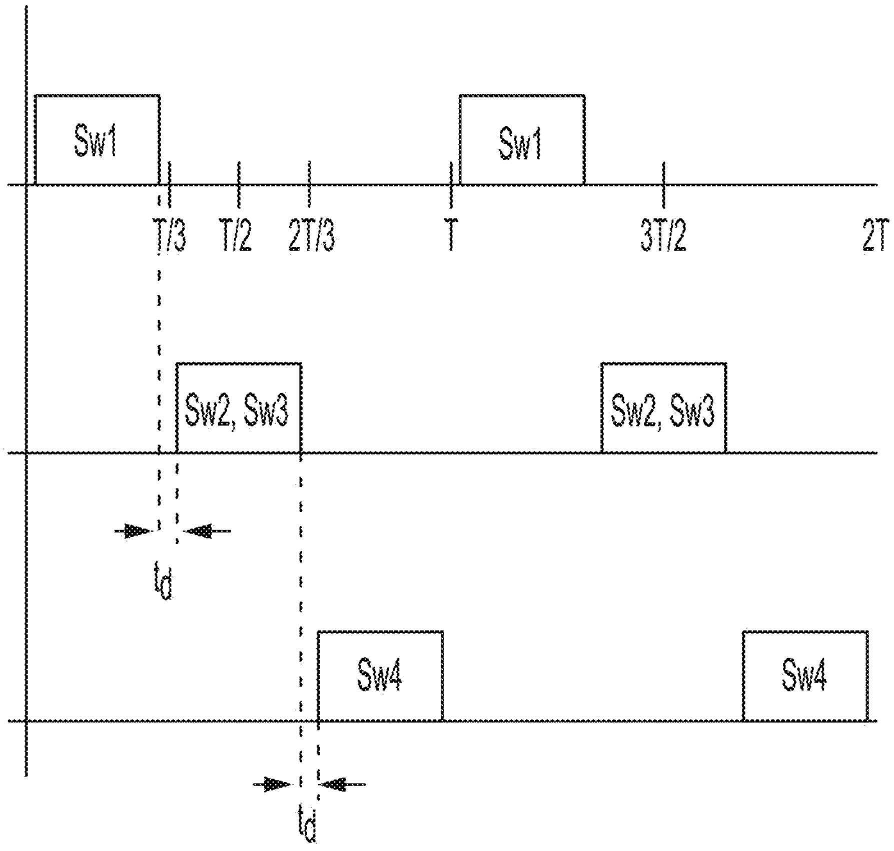
FIG. 4B illustrates a switching scheme for switches Sw1-Sw4 shown in FIG. 5A.
Figure 4C:
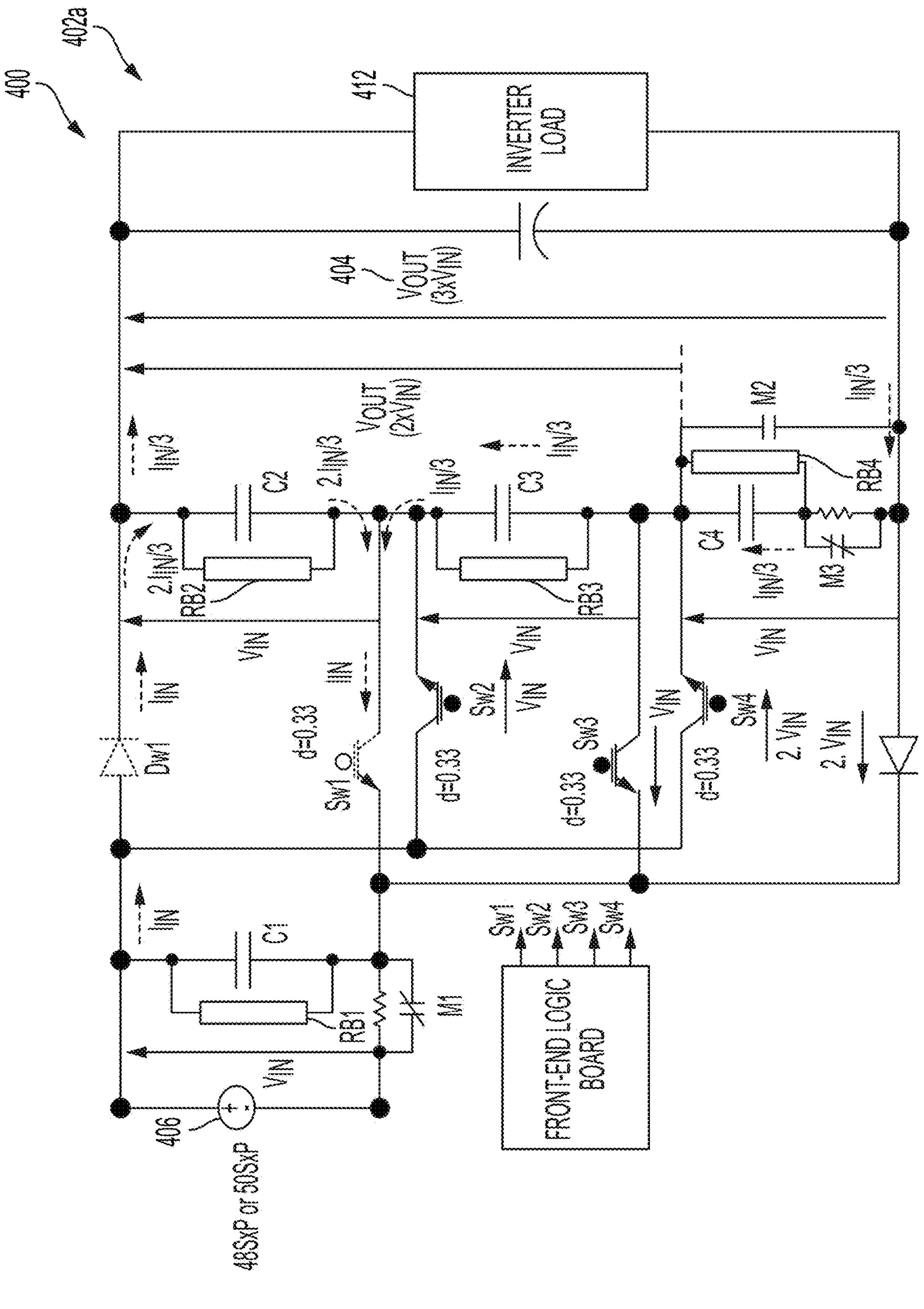
FIG. 4C illustrates a current flow diagram for a first of three different operating modes for a voltage tripler configuration.
Figure 4D:
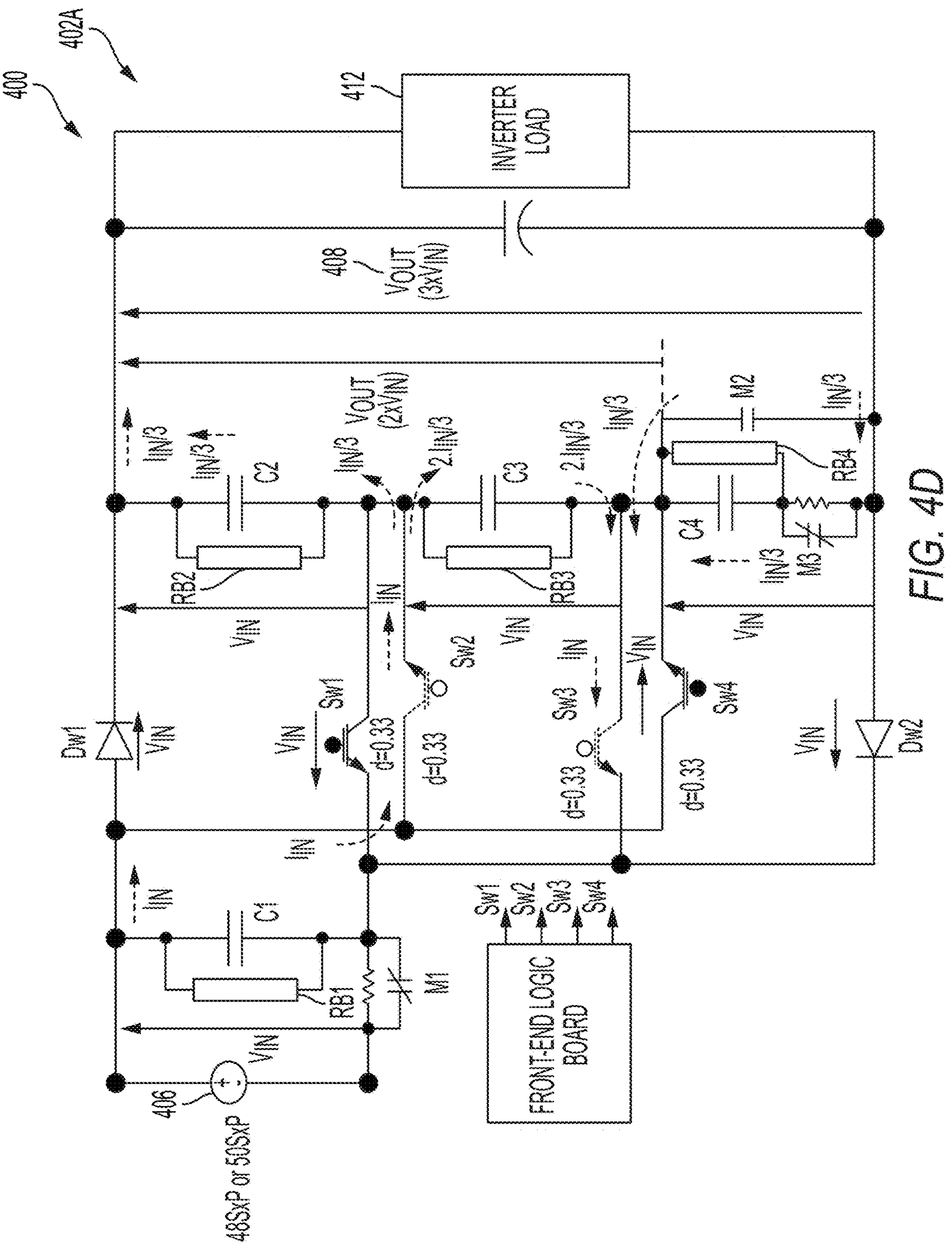
FIG. 4D illustrates a current flow diagram for a second of three different operating modes for the voltage tripler configuration.
Figure 4E:
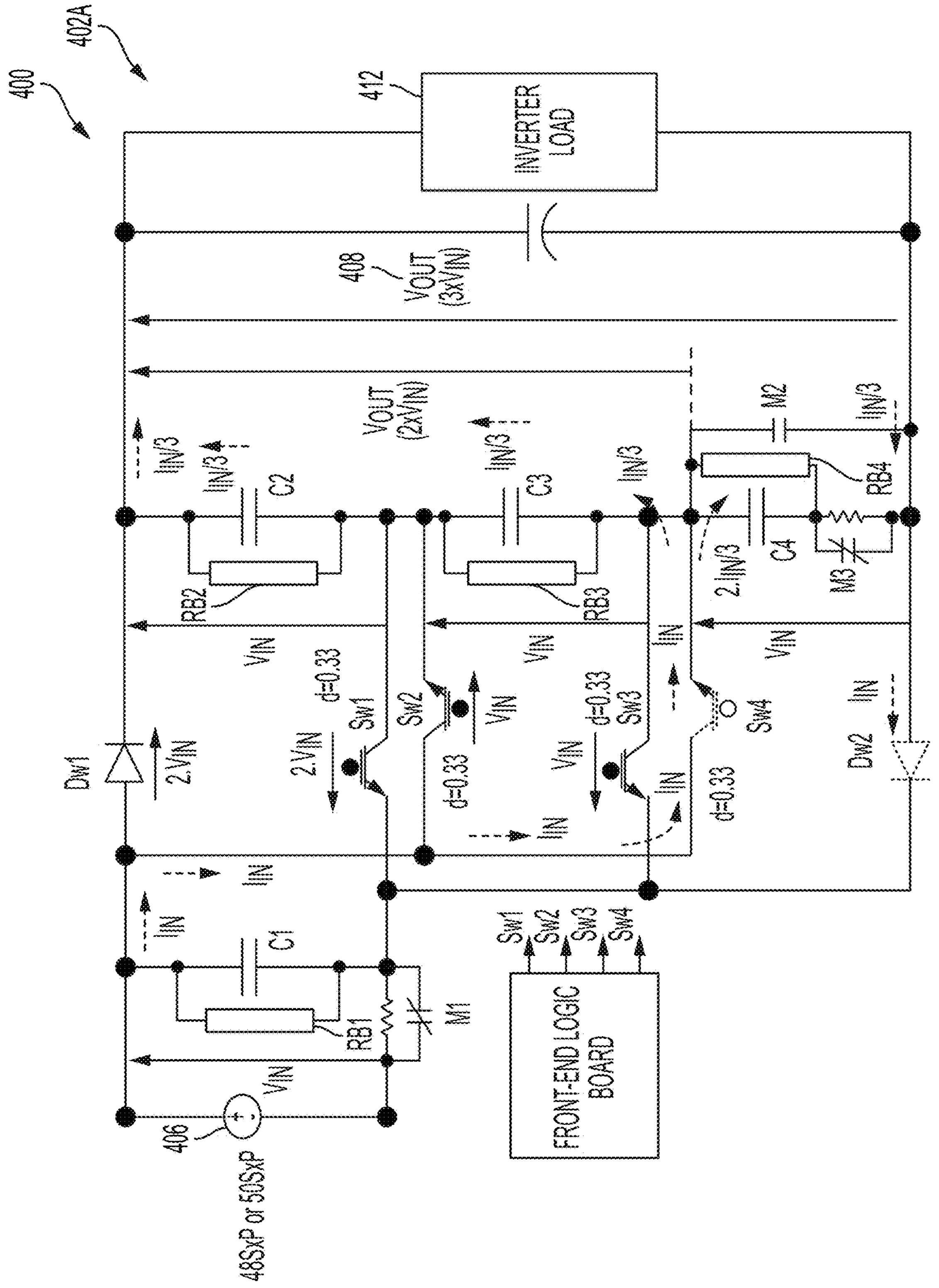
FIG. 4E illustrates a current flow diagram for a third of three different operating modes for the voltage tripler configuration.

The current paths are shown in FIGS. 4C, 4D, 4E for three different modes of operation of the voltage tripler. For the illustrated embodiment, the duty cycle of all the switches is maintained at 33%. The blocking voltage across one set of switch-diode combinations is $V_{IN}$ while the voltage across the other non-conducing switch-diode combinations is $2^*V_{IN}$, as shown in FIG. 4C. Current distribution is also different compared to the voltage doubler configuration. The total input volt-ampere rating may balance out the output volt-ampere rating.

Referring now to FIG. 4C, FIG. 4D and FIG. 4E during operation of the voltage tripler configuration 402A of the reconfigurable circuit 400. Sw1, Sw2, Sw3, and Sw4 are turned ON and OFF in a sequence as shown in FIG. 4B. When Sw1 is turned ON, energy is transferred from C1 to the output capacitor C2 via diode Dw1 and switch Sw1. A current of $2I_{IN}/3$ flows into C2 and $I_{IN}/3$ flows into the load 412. The current flowing into C2 ($2I_{IN}/3$) charges C2. The return path of the output load current ($I_{IN}/3$) takes it through capacitors C4 and C3, thereby discharging both capacitors for this duration. Currents $2I_{IN}/3$ and $I_{IN}/3$ combine and flow back into C1 via Sw1 as $I_{IN}$. When Sw2 and Sw3 are turned ON next (FIG. 4D), input capacitor C1 is connected across C3 and energy is transferred from C1 to C3 via Sw2 and Sw3. A current of $2I_{IN}/3$ flows into C3 and $I_{IN}/3$ flows into the load 412 via C2. The current flowing into C2 ($I_{IN}/3$) discharges C2 for this duration. The return path of the output load current ($I_{IN}/3$) takes it through capacitor C4, thereby discharging C4 for this duration. Currents $2I_{IN}/3$ and $I_{IN}/3$ combine and flow back into C1 via Sw3 as $I_{IN}$. When Sw4 is turned ON next (FIG. 4E), input capacitor C1 is connected across C4 and energy is transferred from C1 to C4 via Sw4 and Dw2. $2I_{IN}/3$ flows into C4 and $I_{IN}/3$ flows into the load 412 via C3 and C2. The current flowing into C3 and C2 ($I_{IN}/3$) discharges C3 and C2 for this duration. The return path of the output load current ($I_{IN}/3$) combines with the current through C4 ($2I_{IN}/3$) and flow back into C1 via Dw2 as $I_{IN}$. In all three modes of operation of the voltage tripler configuration 402*a*, the discharge of either C2 or C3 or C4 balances the charging of C2, C3, or C4, correspondingly. This allows the average output voltage to be constant at 3 times the input voltage $V_{IN}$.

Figure 5A:
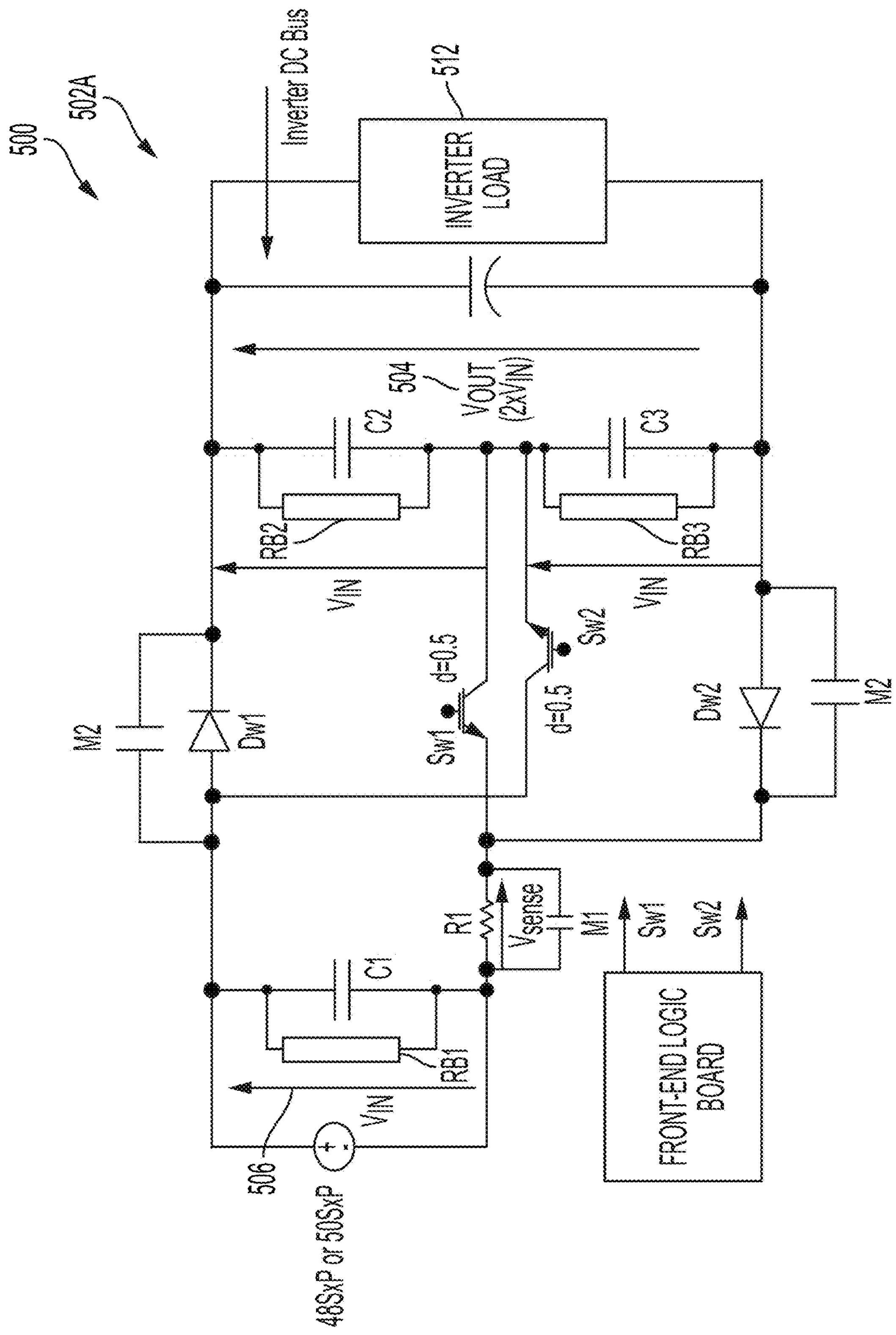
FIG. 5A illustrates a schematic of a 120 VAC inverter platform.

Referring now to FIG. 5A, a reconfigurable circuit 500 is shown in a voltage doubling configuration 502A. The battery pack 506 is a 50 s battery pack and is assumed to start off at 4.2V per cell, the maximum battery pack voltage for the battery pack 506 at that moment will be 210 VDC. This is higher than the minimum needed for satisfactory inverter operation (331.9 VDC according to eqn. [1]). Under such a condition, the voltage doubler 502A may be unnecessary to use for a 120 VAC output inverter. The lowest voltage that the cells may discharge to before the voltage doubler 502A is put into the reconfigurable circuit 500 is computed to be 3.5 V per cell (according to [7]).

As the battery pack 506 discharges and the cell voltage drops below 3.5V per cell, the voltage doubler 502A is activated. From (7), the cells can discharge down to 3.5V per cell after which the doubler circuit is engaged to help boost up the DC bus voltage. When the voltage doubler 502A is engaged at 3.5V per cell, the DC bus voltage will gradually increase from 175 VDC to 345 VDC, considering the 5V drop across the conducting switches in the voltage doubler configuration 502A. Since the DC bus capacitors are assumed to be rated at 500 VDC, this voltage of 345 VDC can be accommodated.

As the battery pack 506 discharges into the load, the voltage across each cell will continue to drop. Eventually, at its lowest cell voltage of 2.5V per cell, 50 s pack will generate a voltage of 125 VDC. The voltage at the output of the voltage doubler may be determined using (16) as:

$$V_{DC} = (2.5 \times 50 \times 2) - 5 = 245\ Vdc \qquad (16)$$

Voltage drop of 5V across the switches in the switched capacitor topology is included in this estimation. A 245 VDC voltage is higher than the minimum voltage requirement of the DC bus in the 120 VAC application (173.2 VDC), and the unit should therefore operate satisfactorily.

A separate 120 VAC topology is now described in reference to FIGS. 5A-D. A 120 VAC topology for a reconfigurable circuit 500 is now described. As part of the control scheme, it is assumed that the cells in the 50 s pack are charged up to 4.2V per cell. Contactor M1 remains open to allow the soft charging of the main capacitors C2 and C3 through resistor R1. After the soft charge period, contactors M1 and M2 close. Closing of the contacts M2 across Dw1 and Dw2 allow bypassing these diodes. Energy flows from the battery pack 506 and C1 into C2, C3, and the load via the soft charge contactor M1 and bypass contactors M2. When the voltage of the battery pack 506 starts dropping and the cell voltage nears 3.5V per cell for 50 s pack or 3.64V for 48 s pack, gating to switches Sw1 and Sw2 is activated. Contactor M1 and M2 turn OFF since the input voltage $V_{IN}$ falls below 175 VDC. The output voltage $V_{OUT}$ gradually increases from 175 VDC to 345 VDC at which time only contactor M1 is closed again to bypass the soft charge resistor R1. Contactor M2 remains open as long as the input voltage $V_{IN}$ is less than 175 VDC so that current flows through Dw1 and Dw2 during their respective periods of conduction.

Figure 5B:
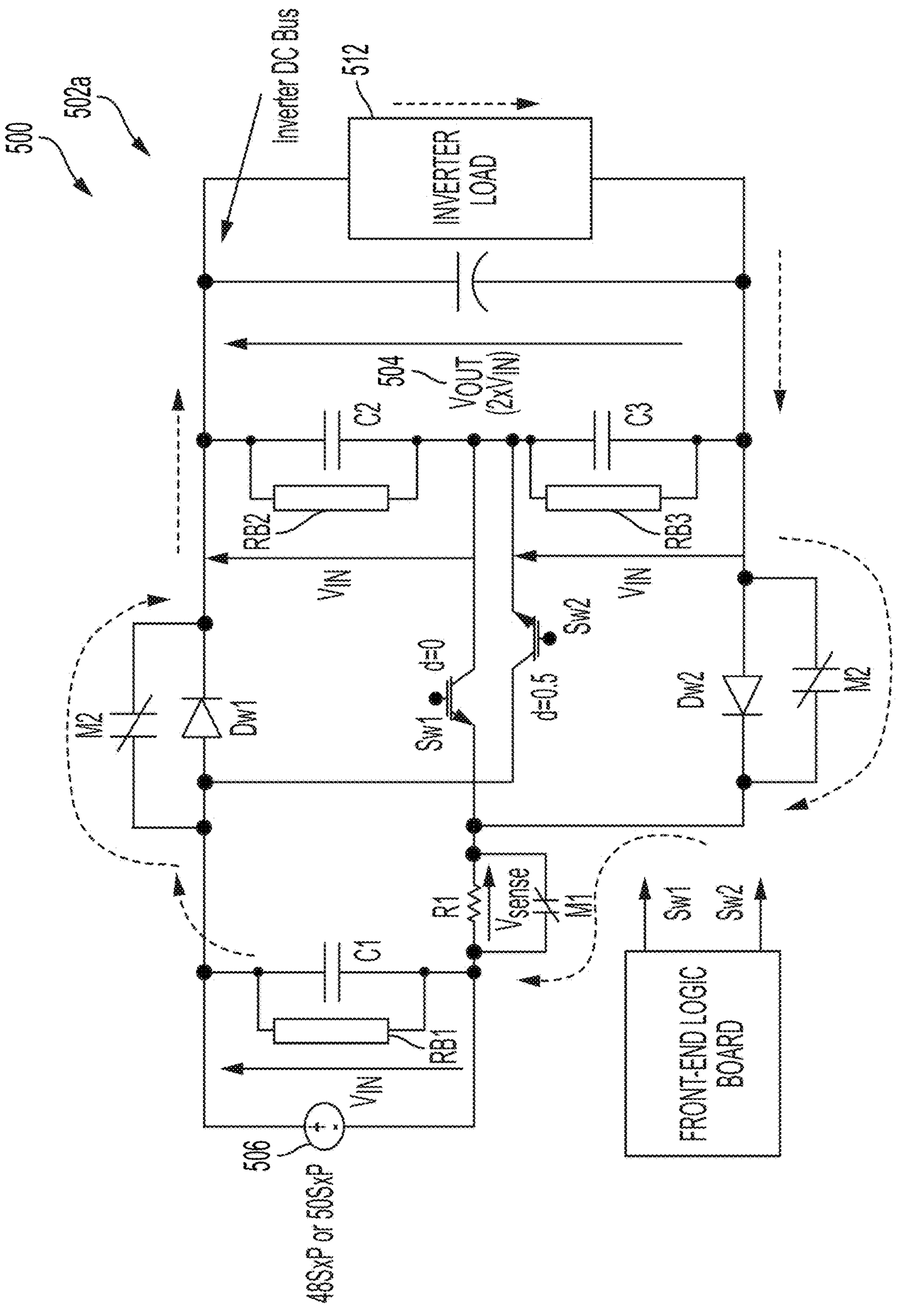
FIG. 5B illustrates a first of two operating modes for the 120 VAC inverter platform of FIG. 5A, according to embodiments described herein.

Referring to FIG. 5B, the current path during the two distinct modes of operation ($V_{IN}$>175 VDCc and $V_{IN}$<175 VDC), is shown. When the input voltage $V_{IN}$ is greater than 175 VDC, current flows through contactors M2 and M1. No switching action takes place and the gating for Sw1 and Sw2 remain OFF.

Figure 5C:
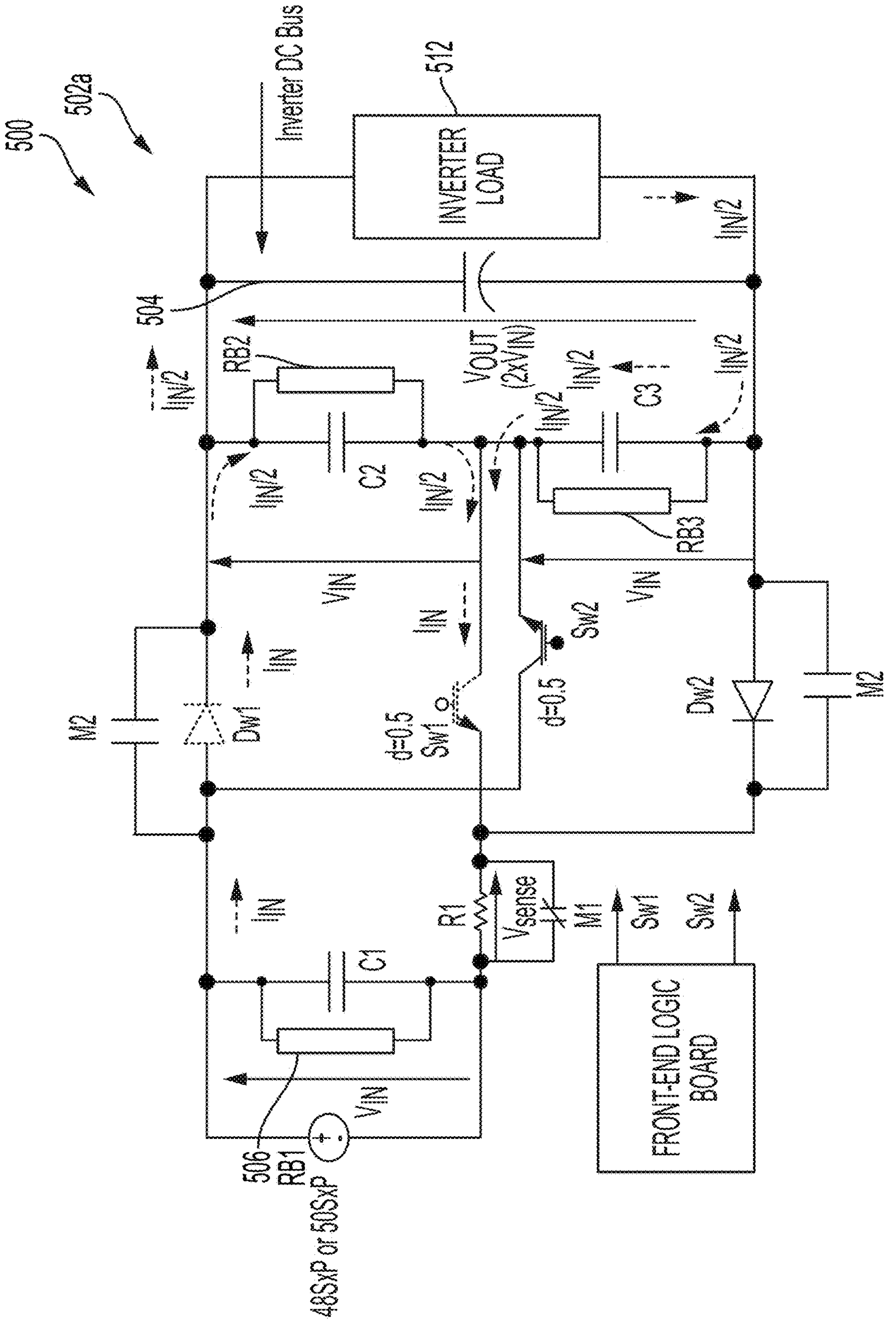
FIG. 5C illustrates a second of two operating modes for the 120 VAC inverter platform of FIG. 5A, according to embodiments described herein.
Figure 5D:
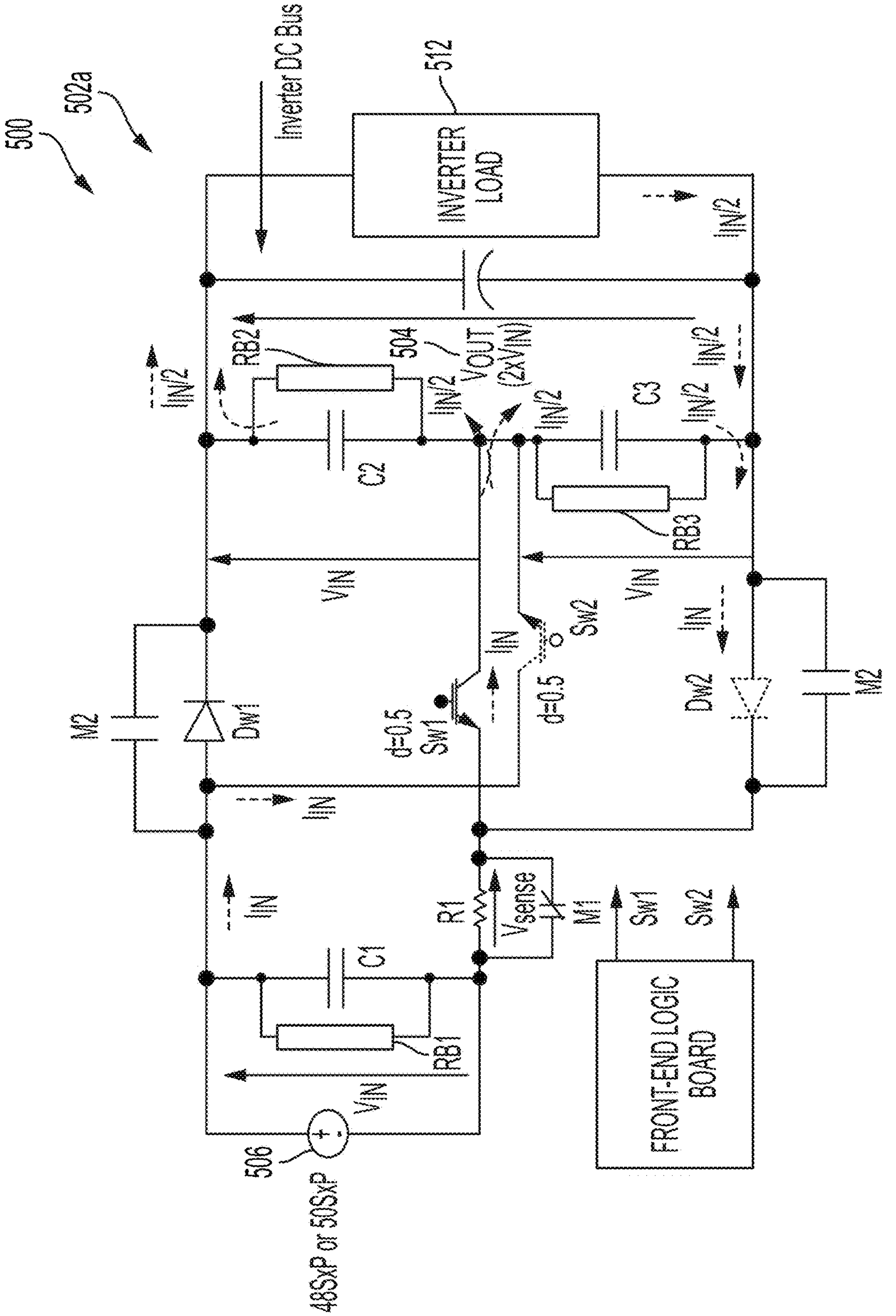
FIG. 5D illustrates a first operating mode for the 120 VAC inverter platform of FIG. 5A, according to embodiments described herein.

Referring to FIG. 5C, when $V_{IN}$ falls below 175 VDC, contactors M1 and M2 are turned OFF and their contacts open. Sw1 and Sw2 are gated at a duty cycle of 50%. The output voltage $V_{OUT}$ gradually increases from 175 VDC to 345 VDC at which time only contactor M1 is closed again to bypass the soft charge resistor R1. Contactor M2 remains open as long as the input voltage $V_{IN}$ is less than 175 VDC so that current flows through Dw1 and Dw2 during their respective periods of conduction. During operation of the voltage doubler configuration 502A of the reconfigurable circuit 500, Sw1, and Sw2 are turned ON and OFF alternately. When Sw1 is ON, energy is transferred from the input capacitor C1 to the output capacitor C2 via diode Dw1 and switch Sw1. Half of the output current flows into capacitor C2 charging it and the other half flows into the load 512. The return path of the output load current takes it through C3, which discharges capacitor C3 for this duration. Similarly, when Sw2 is turned ON, the input capacitor C1 is connected across C3 and energy is transferred from C1 to C3 via Sw2 and Dw2. Half of the output current flows through C2 into the load during which time it discharges C2. The other half flows into C3, which charges capacitor C3. The return current from the load and the current through C3 combine to form the current flowing back into the battery pack 506 via Dw2. In both modes of operation of the voltage doubler configuration 502A, the discharge of either C2 or C3 balances the charging of C3 or C2, respectively. This allows the average output voltage to be constant at 2 times the input voltage $V_{IN}$.

Figure 6:
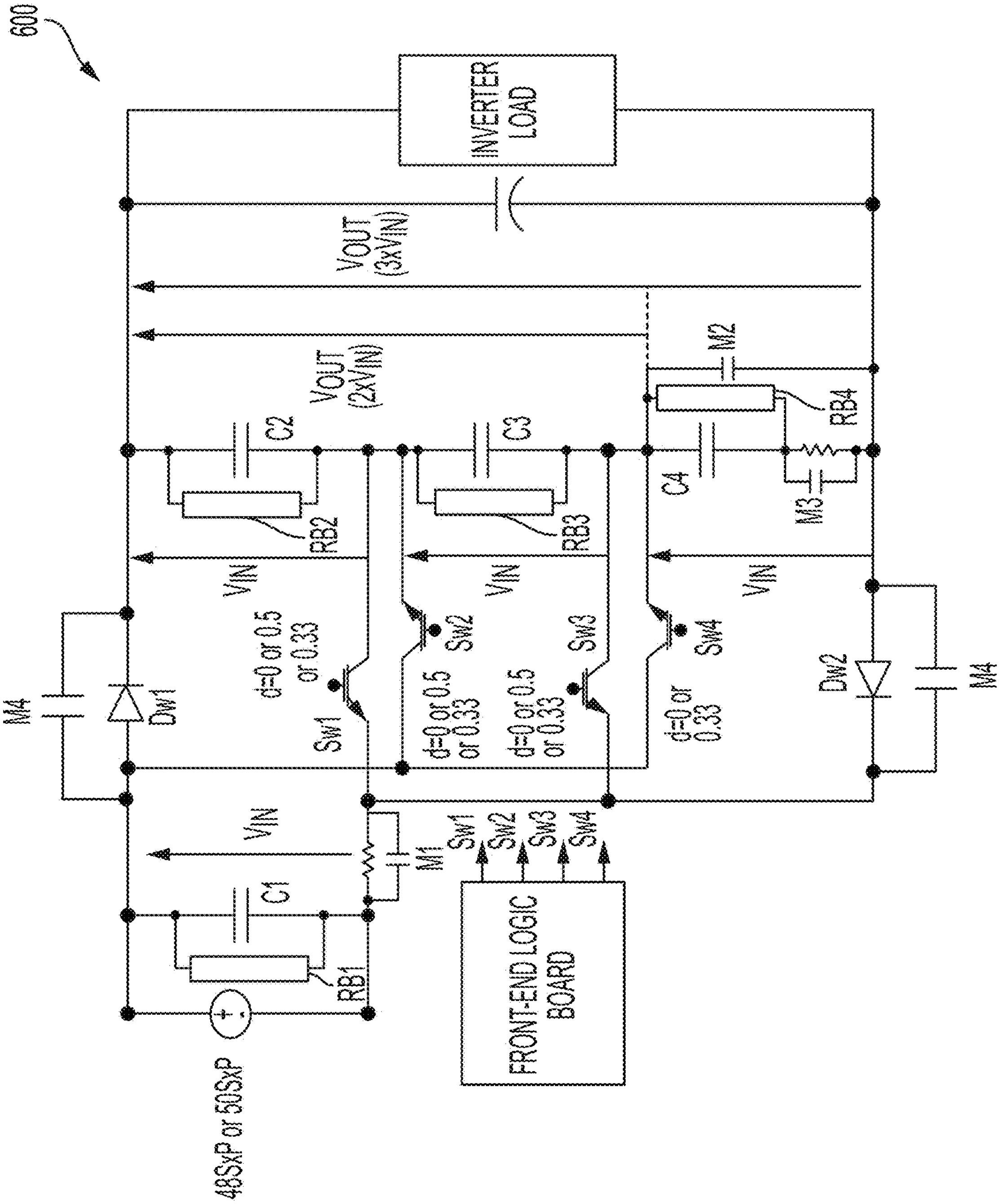
FIG. 6 illustrates a schematic of the reconfigurable switched capacitor topology for use in either a 120 VAC inverter platform application or a 230 VAC inverter platform application.

The source can either be a 50 s pack or a 48 s pack. The topological rendering 600 is shown in FIG. 6. The Table 1 shows the various operating modes for this configuration.

TABLE 1

| |
|---|
| FOR 230VAC: |
| $V_{IN}$ > 3.36 V/CELL FOR 50 S PACK (3.5 V/CELL FOR 48 S PACK) |
| M2 = ON |
| SW4 = OFF |
| D = 0.5 FOR SW1, SW2, AND SW3 |
| D = 0 FOR SW4 |
| M4 = OFF |

TABLE 1-continued

| |
|---|
| FOR 230VAC: |
| $V_{IN}$ < 3.36 V/CELL FOR 50 S PACK (3.5 V/CELL FOR 48 S PACK) |
| M2 = M4 = OFF |
| D = 0.33 FOR SW1-SW4 |
| M3 TURNS ON AFTER A SHORT TIME |
| FOLLOWING THE GATING OF SW4 |
| FOR 120VAC: |
| $V_{IN}$ > 3.5 V/CELL FOR 50 S PACK (3.64 V/CELL FOR 48 S PACK) |
| M2 = M4 = ON |
| SW1-SW4 = OFF |
| D = 0 FOR ALL SWITCHES |
| M3 = OFF |
| M1 = ON AFTER SOFT-CHARGE |
| FOR 120VAC: |
| $V_{IN}$ < 3.5 V/CELL FOR 50 S PACK (3.64 V/CELL FOR 48 S PACK) |
| M3 = M4 = OFF |
| M2 = ON |
| D = 0.5 FOR SW1, SW2, AND SW3 |
| D = 0 FOR SW4 |
| M1 TURNS ON AFTER A SHORT TIME |
| FOLLOWING THE GATING OF SW1-SW3 |

Figure 7:
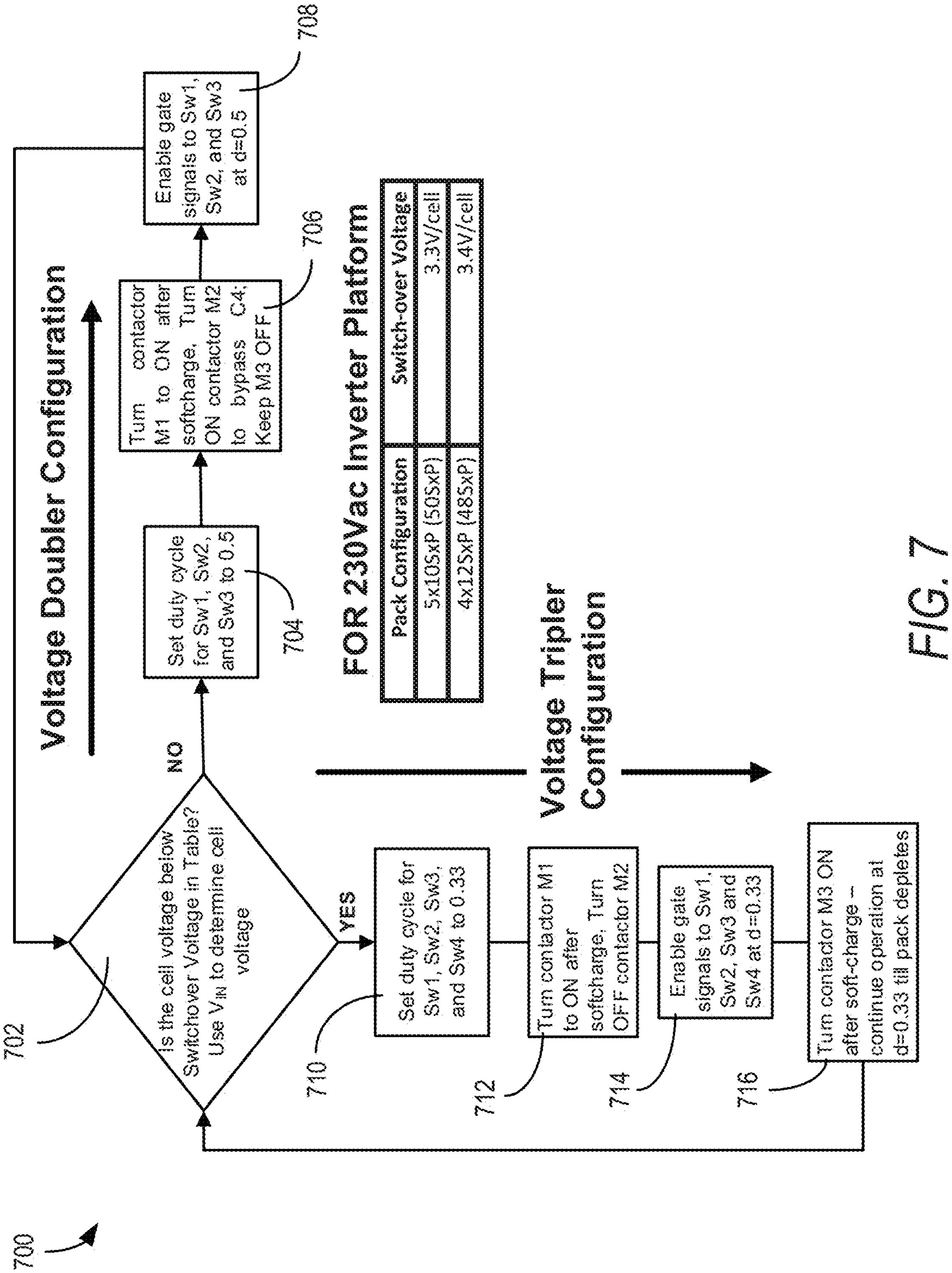
FIG. 7 illustrates a flow diagram detailing steps for operation of the reconfigurable switched capacitor topology for a 230 VAC inverter platform.

Referring now to FIG. 7, a flow diagram 700 for using the reconfigurable circuit 500 in the voltage doubler configuration and voltage tripler configuration to address the 230V rest-of-world (ROW) application is shown (i.e., other than North America). At block 704, the electronic processor sets the duty cycle for Sw1, Sw2, and Sw3 to 0.5 (50%). At block 706, the electronic processor turns contactor M1 ON after softcharge and turns contactor M2 ON. At block 708, the electronic processor enables gate signals to Sw1, Sw2, and Sw3 at d=0.5 (50% duty cycle). At block 702, the electronic processor determines that the cell voltage is below a switchover threshold. At block 710, the electronic processor sets the duty cycle for Sw1, Sw2, Sw3, and Sw4 to 0.33 (33%). At block 712, the electronic process turns contactor M1 ON after softcharge and turns contactor M2 OFF. At block 714, the electronic processor enables gate signals to Sw1, Sw2, Sw3 and Sw4 at d=0.33 (33% duty cycle). At block 716, the electronic processor turns contactor M3 ON after softcharge and continues operation at d=0.33 (33%) until the battery pack depletes to its lowest SOC level.

Referring now to FIG. 8, a flow diagram 800 for using the reconfigurable circuit 500 in the direct connect configuration and voltage doubler configuration to address the 120V (North American) application is shown (i.e., not ROW). At block 804, the electronic processor sets duty cycle for Sw1, and Sw2 to 0 (0%). At block 806, the electronic processor turns contactor M1 ON after softcharge, and turns contactor M2 ON. At block 808, the electronic processor keeps Sw1 and Sw2 OFF. At block 802, the electronic processor determines that the cell voltage is below a switchover threshold. At block 810, the electronic processor sets duty cycle for Sw1, and Sw2 to 0.5 (50%). At block 812, the electronic processor turns contactor M1 to ON after softcharge and Turns OFF contactor M2. At block 814, the electronic processor enables gate signals to Sw1, and Sw2 at d=0.5 (50%). At block 816, the electronic processor turns contactor M1 ON after soft-charge and continues operation at d=0.5 (50%) until the battery pack depletes to its lowest SOC level.

Accordingly, a reconfigurable switched capacitor topology is presented for the power supply 1. Its main application is intended for a 230 VAC inverter platform and a 120 VAC inverter platform. The reconfigurable inverter platform proposed here can be separated, one for the 230 VAC inverter platform and the other for the 120 VAC inverter platform.

For the above chosen battery pack, and for a 230 VAC inverter platform, the reconfigurable switched capacitor scheme entails using a voltage doubler when the cells are at or near to their rated state of charge (SOC), which typically corresponds to 4.2V per cell. The topology is converted into a voltage tripler as the battery pack's voltage reduces and falls below 3.36V per cell for the 50 S pack or 3.5V per cell for the 48 S pack. This ensures healthy DC bus voltage for satisfactory operation of the inverter.

Similar methodologies can be performed for the 120 VAC inverter platform. In some embodiments, no voltage transformation is used for either the 50 S battery pack or 48 S battery pack when the packs were close to their rated SOC (4.2V per cell). When the pack voltage drops down to 3.5V per cell for the 50 S pack and 3.64V per cell for the 48 S pack, the voltage doubler configuration is activated to result in a healthy DC bus voltage that can support the 120 VAC inverter.

Thus, embodiments described herein provide, among other things, a reconfigurable voltage boost circuit. Various features and advantages are set forth in the following claims.

What is claimed is:

1. A power supply comprising:

a battery pack;

a sensor configured to sense an electrical characteristic of the battery pack;

a reconfigurable voltage boost circuit configured to connect to an inverter, the reconfigurable voltage boost circuit configured to switch between a voltage doubler configuration and a voltage tripler configuration in response to a switching control signal based on the electrical characteristic of the battery pack, a controller connected to the battery pack, the sensor, and the reconfigurable voltage boost circuit, the controller configured to:

obtain the electrical characteristic of the battery pack from the sensor, compare the electrical characteristic to a switching threshold, and transmit the switching control signal to the reconfigurable voltage boost circuit based on the comparison of the electrical characteristic and the switching threshold to switch between the voltage doubler configuration and the voltage tripler configuration.

2. The power supply of claim 1, wherein the power supply is configured to supply voltage from the battery pack to a load, and wherein the reconfigurable voltage boost circuit is connected to an inverter and is configured to switch between the voltage doubler configuration and the voltage tripler configuration to meet a voltage requirement of the inverter in response to a drop in a charge of the battery pack.

3. The power supply of claim 1, wherein the reconfigurable voltage boost circuit includes a first switch, a second switch, a third switch, and a fourth switch, wherein the first switch, second switch, third switch, and fourth switch are configured to reconfigure the reconfigurable voltage boost circuit between the voltage doubler configuration and the voltage tripler configuration in response to the switching control signal.

4. The power supply of claim 1, wherein the power supply is configured to generate at least 230 VAC in the voltage tripler configuration.

5. The power supply of claim 4, further including:

a direct current (DC) bus connected to the reconfigurable voltage boost circuit and configured to supply DC to a load connected to the power supply; and a DC bus capacitor connected to the DC bus, the DC bus capacitor rated to at least 500 VDC.

6. The power supply of claim 1, wherein, to compare the electrical characteristic to the switching threshold, the controller is configured to determine that a cell voltage of the battery pack is below the switching threshold.

7. The power supply of claim 6, wherein, to determine that the cell voltage of the battery pack is below the switching threshold, the controller is configured to:

determine that the cell voltage has reached or fallen below 3.64V, when the battery pack includes up to 48 cells connected in series; and determine that the cell voltage has reached or fallen below 3.5V, when the battery pack includes 50 or more cells connected in series.

8. A power supply comprising:

a battery pack;

a sensor configured to sense an electrical characteristic of the battery pack;

a reconfigurable voltage boost circuit configured to connect to an inverter, the reconfigurable voltage boost circuit configured to switch between direct connection of the battery pack and a voltage doubler configuration in response to a switching control signal based on the electrical characteristic of the battery pack; and a controller connected to the battery pack, the sensor, and the reconfigurable voltage boost circuit, the controller configured to:

obtain the electrical characteristic of the battery pack from the sensor, compare the electrical characteristic to a switching threshold, and transmit the switching control signal to the reconfigurable voltage boost circuit based on the comparison of the electrical characteristic and the switching threshold to switch between the direct connection and the voltage doubler configuration.

9. The power supply of claim 8, wherein the power supply is configured to supply voltage from the battery pack to a load, and wherein the reconfigurable voltage boost circuit is connected to an inverter and is configured to switch between the direct connection and the voltage doubler configuration to meet a voltage requirement of the inverter in response to a drop in a charge of the battery pack.

10. The power supply of claim 8, wherein the reconfigurable voltage boost circuit includes a first switch and a second switch, wherein the first switch and second switch are configured to reconfigure the reconfigurable voltage boost circuit between the direct connection and the voltage doubler configuration in response to the switching control signal.

11. The power supply of claim 8, wherein the power supply is configured to generate at least 120 VAC in the voltage doubler configuration.

12. The power supply of claim 11, further including:

a direct current (DC) bus connected to the reconfigurable voltage boost circuit and configured to supply DC to a load connected to the power supply; and a DC bus capacitor connected to the DC bus, the DC bus capacitor rated to at least 500 VDC.

13. The power supply of claim 8, wherein, to compare the electrical characteristic to the switching threshold, the controller is configured to determine that a cell voltage of the battery pack is below the switching threshold.

14. The power supply of claim 13, wherein, to determine that the cell voltage of the battery pack is below the switching threshold, the controller is configured to:

determine that the cell voltage has reached or fallen below 3.64V, when the battery pack includes up to 48 cells connected in series; and determine that the cell voltage has reached or fallen below 3.5V, when the battery pack includes 50 or more cells connected in series.

15. A reconfigurable voltage boost circuit configured to switch between a direct connection and a voltage doubler configuration, the reconfigurable voltage boost circuit comprising;

a first switch, a second switch, a third switch, and a fourth switch; and an input capacitor and two output capacitors, wherein the first switch and the second switch are configured to reconfigure the reconfigurable voltage boost circuit between the direct connection and the voltage doubler configuration in response to a switching control signal, wherein the reconfigurable voltage boost circuit is configured to be connected to an inverter and a battery pack, wherein the reconfigurable voltage boost circuit is configured to provide voltage from the battery pack to a load, and wherein the reconfigurable voltage boost circuit is configured to switch between the direct connection and the voltage doubler configuration to meet a voltage requirement of the inverter in response to a drop in a charge of the battery pack.

16. The reconfigurable voltage boost circuit of claim 15, further configured to switch between direct connection and the voltage doubler configuration in response to the switching control signal, wherein the switching control signal is based on a determination that a cell voltage of the battery pack is below a switching threshold.

17. The reconfigurable voltage boost circuit of claim 16, wherein, to determine that the cell voltage of the battery pack is below the switching threshold, the reconfigurable voltage boost circuit is configured to:

determine that the cell voltage has reached or fallen below 3.64V, when the battery pack includes up to 48 cells connected in series; and determine that the cell voltage has reached or fallen below 3.5V, when the battery pack includes 50 or more cells connected in series.

18. The reconfigurable voltage boost circuit of claim 15, wherein the reconfigurable voltage boost circuit is configured to generate at least 120 VAC in the voltage doubler configuration.

19. The reconfigurable voltage boost circuit of claim 15, wherein the reconfigurable voltage boost circuit is configured to connect to a direct current (DC) bus of a power supply, the power supply configured to supply DC to a load.

20. The reconfigurable voltage boost circuit of claim 19, wherein a DC bus capacitor of the DC bus is rated to at least 500 VDC.

* * * * *